(12) United States Patent
Horiuchi et al.

(10) Patent No.: US 9,342,872 B2
(45) Date of Patent: May 17, 2016

(54) COLOR CORRECTION PARAMETER COMPUTATION METHOD, COLOR CORRECTION PARAMETER COMPUTATION DEVICE, AND IMAGE OUTPUT SYSTEM

(71) Applicant: Panasonic Intellectual Property Management Co., Ltd., Osaka (JP)

(72) Inventors: Koji Horiuchi, Fukuoka (JP); Tadanori Tezuka, Fukuoka (JP); Hiroto Tomita, Fukuoka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/715,609

(22) Filed: May 19, 2015

(65) Prior Publication Data

US 2015/0348245 A1    Dec. 3, 2015

(30) Foreign Application Priority Data

May 30, 2014   (JP) ................................ 2014-112411

(51) Int. Cl.
*G06K 9/00*    (2006.01)
*G06T 5/00*    (2006.01)
(Continued)

(52) U.S. Cl.
CPC . *G06T 5/005* (2013.01); *G06T 5/50* (2013.01); *G06T 7/408* (2013.01); *H04N 9/646* (2013.01); *G06T 2207/10024* (2013.01)

(58) Field of Classification Search
None
See application file for complete search history.

(56) References Cited

U.S. PATENT DOCUMENTS 6,437,792 B1 *   8/2002   Ito ....................... H04N 1/6058
                                                            345/590
6,876,467 B1 *   4/2005   Yamaguchi ........... B41J 11/0095
                                                            347/172

(Continued)

FOREIGN PATENT DOCUMENTS

| JP | 2005-045446 | 2/2005 |
| JP | 2010-124168 | 6/2010 |
| JP | 2011-259047 | 12/2011 |

OTHER PUBLICATIONS

Everts, J. C. van Gemert, and T. Gevers. Per-patch descriptor selection using surface and scene attributes. In ECCV, 2012. 2, 4, 7.*

(Continued)

*Primary Examiner* — Andrae S Allison
(74) *Attorney, Agent, or Firm* — Greenblum & Bernstein, P.L.C.

(57) ABSTRACT

A color correction parameter computation method includes: obtaining first color-signal values respectively corresponding to colors of color patches and obtained by photographing a color chart having the patches thereon, and reference color-signal values respectively defining the colors of the patches; computing, for each color of the patches, a color difference component between the first and the reference color-signal values; selecting at least one color of the patches by comparing the magnitude of the difference components; computing a color correction parameter using the first and the reference color-signal values corresponding to the selected color; computing an accuracy measure using the difference component between a second corrected color-signal value obtained by correcting a first color-signal value corresponding to a color other than the selected color and the reference color-signal value defining the color other than the selected color; and determining correction accuracy by comparing the accuracy measure to an accuracy criterion.

16 Claims, 15 Drawing Sheets

(51) Int. Cl.
*G06T 5/50* (2006.01)
*G06T 7/40* (2006.01)
*H04N 9/64* (2006.01)

(56) References Cited

U.S. PATENT DOCUMENTS

| | | | |
|---|---|---|---|
| 7,433,096 B2* | 10/2008 | Chase | H04N 1/407 |
| | | | 358/504 |
| 2004/0151370 A1* | 8/2004 | Sasaki | H04N 1/628 |
| | | | 382/162 |
| 2005/0063585 A1* | 3/2005 | Matsuura | H04N 1/6033 |
| | | | 382/162 |
| 2005/0213128 A1* | 9/2005 | Imai | H04N 1/6077 |
| | | | 358/1.9 |
| 2006/0093211 A1* | 5/2006 | Matsuura | H04N 1/6033 |
| | | | 382/162 |
| 2006/0204084 A1* | 9/2006 | Matsuura | H04N 1/6033 |
| | | | 382/162 |
| 2007/0019218 A1* | 1/2007 | Sumi | H04N 1/6033 |
| | | | 358/1.9 |
| 2008/0298676 A1* | 12/2008 | Matsuura | H04N 1/603 |
| | | | 382/162 |
| 2012/0075645 A1* | 3/2012 | Katayama | H04N 1/6055 |
| | | | 358/1.9 |

OTHER PUBLICATIONS

Jon S. McElvain, Walter Gish, Camera Color Correction Using Two-Dimensional Transforms, Color Imaging Conference p. 250-256, 2013.*

Tezuka et al., "A Color Correction Method by Utilizing the Color Space Transformation" Transactions of Information Processing Society of Japan, vol. 39, No. 3, Mar. 1998, pp. 586-588.

Kenichi Kanatani et al., "Extended FNS for Constrained Parameter Estimation" IPSJ SIG Technical Report, 2007-CVIM-158-4, Mar. 2007, pp. 27-29.

* cited by examiner

COLOR CORRECTION PARAMETER COMPUTATION METHOD, COLOR CORRECTION PARAMETER COMPUTATION DEVICE, AND IMAGE OUTPUT SYSTEM

BACKGROUND

1. Technical Field

The present disclosure relates to a method for computing color correction parameters for use in color correction to image information such as image signals output from an image capture device.

2. Description of the Related Art

It is a common practice to capture an image of an object using an image capture device, such as a digital camera (digital still camera or digital video camera) or a scanner, and display the captured image using a display device such as a display or a projector. For example, a certain scene can be photographed with a digital camera and the image of the scene can be displayed on a display. In such a situation, colors that are perceived in the real scene typically do not match colors perceived from the scene reproduced on the display even if the digital camera and the display adhere to the same standard for color space. More specifically, when a certain color is considered, the color coordinate values in the real scene do not agree in a color space with the color coordinate values reproduced on a display. The characteristics of an optical system including lenses, color filters, and an image sensor vary from one image capture device to another. Thus, the degree of such inconsistency of colors varies depending on the image capture device used for photographing the scene.

In view of these circumstances, color correction is usually applied to image signals or image data obtained by an image capture device. As an example, a technique is known that approximates the colors of a color image being reproduced to the original colors through a color correction process using a color conversion matrix (Japanese Unexamined Patent Application Publication No. 2005-45446). The technique according to Japanese Unexamined Patent Application Publication No. 2005-45446 determines such a color conversion matrix that reduces the color difference calculated using the L*, a*, and b* components of the target color and the L*, a*, and b* components of a corrected color in CIE 1976 L*a*b* color space (hereinafter sometimes referred to as "CIE-L*a*b* color space") by iterative solution of the least squares method. A unit matrix is used as the initial value in optimization of the color conversion matrix. In the color conversion matrix computation method described in Japanese Unexamined Patent Application Publication No. 2010-124168, only a* and b* out of the L*, a*, and b* components are used to perform iterative solution of the least squares method in optimization of the color conversion matrix, thereby reducing the computational load. Japanese Unexamined Patent Application Publication No. 2010-124168 also proposes using a matrix that gives exact corrected values for randomly selected three colors as the initial value in place of a unit matrix so that the color conversion matrix can be optimized with a reduced computational load.

SUMMARY

The techniques of Japanese Unexamined Patent Application Publication Nos. 2005-45446 and 2010-124168 require further improvements, however.

In one general aspect, the techniques disclosed here feature a color correction parameter computation method including: step (a) of obtaining a plurality of first color signal values that respectively correspond to colors of a plurality of color patches and are obtained by photographing a color chart having the color patches on a surface, and a plurality of reference color signal values respectively defining the colors of the color patches; step (b) of computing, for each one of the colors of the color patches, a color difference component between a corresponding one of the first color signal values and a corresponding one of the reference color signal values; step (c) of selecting at least one color of the color patches based on comparison of magnitude of the color difference components obtained in the step (b); step (d) of computing a color correction parameter using the first color signal value corresponding to the selected color and the reference color signal value that defines the selected color, the color correction parameter being a parameter that makes the color difference component between a first corrected color signal value which is obtained by correcting the first color signal value corresponding to the selected color using the color correction parameter and the reference color signal value defining the selected color smaller than the color difference component between the first color signal value corresponding to the selected color and the reference color signal value defining the selected color; step (e) of computing a measure of accuracy using the color difference component between a second corrected color signal value which is obtained by correcting a first color signal value corresponding to a color other than the selected color using the color correction parameter and the reference color signal value that defines the color other than the selected color; and step (f) of determining accuracy of correction by comparing the measure of accuracy to a predetermined accuracy criterion.

The present disclosure has achieved further improvements.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
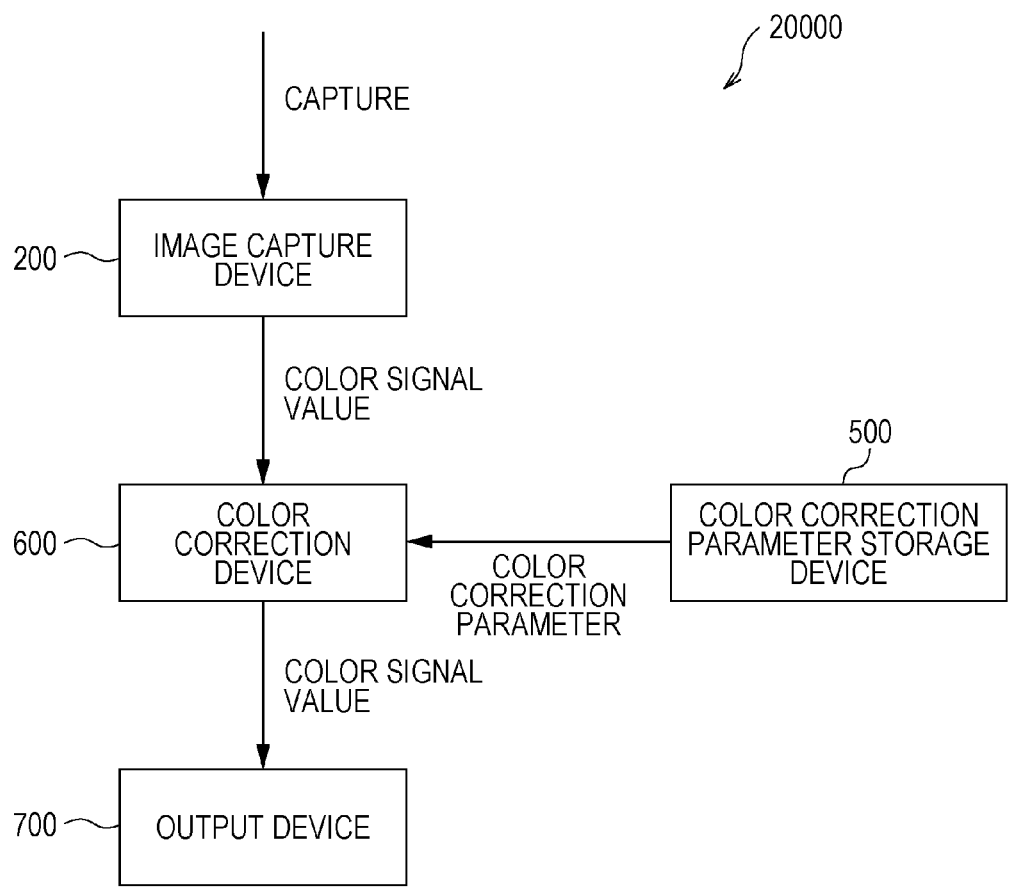
FIG. 1 is a block diagram generally showing an exemplary image output system according to a first embodiment of the present disclosure.

Before describing the embodiments of the present disclosure, specific challenges identified by the present inventor will be discussed.

For reducing the mismatch of colors that are perceived from the real scene and colors perceived in a scene reproduced by a display device through color correction using a color conversion matrix as mentioned above, a strict condition for determining the convergence can be established, for example. In methods of calculating a color conversion matrix such as ones described in Japanese Unexamined Patent Application Publication No. 2005-45446 or No. 2010-124168, however, making the convergence decision condition strict leads to an increase in the number of iterative calculations, or an increase in computational load.

In color correction, there is also a demand that difference from colors perceived from the real scene be reduced for many of the colors included in the scene to be reproduced. In other words, it would be beneficial to be able to approximate various colors included in the scene to be reproduced to ideal colors extensively. However, as more colors are used in calculation of a color conversion matrix, the dimension of the matrix increases and hence the amount of calculation becomes enormous. The method of calculating a color conversion matrix such as described in Japanese Unexamined Patent Application Publication No. 2005-45446 or No. 2010-124168 cannot avoid an exponential increase in the amount of calculation associated with increase in the number of colors used for calculation of the color conversion matrix.

Before describing the embodiments of the present disclosure in detail, the embodiments of the present disclosure will be outlined first.

A color correction parameter computation method according to an aspect of the present disclosure includes steps (a) to (f). In step (a), a plurality of first color signal values that respectively correspond to colors of a plurality of color patches and are obtained by photographing a color chart having the color patches on a surface, and a plurality of reference color signal values respectively defining the colors of the color patches are obtained. In step (b), for each one of the colors of the color patches, a color difference component between a corresponding one of the first color signal values and a corresponding one of the reference color signal values is computed. In step (c), at least one color of the color patches is selected based on comparison of magnitude of the color difference components obtained in the step (b). In step (d), a color correction parameter is computed using the first color signal value corresponding to the selected color and the reference color signal value that defines the selected color. The color correction parameter is a parameter that makes the color difference component between a first corrected color signal value which is obtained by correcting the first color signal value corresponding to the selected color using the color correction parameter and the reference color signal value defining the selected color smaller than the color difference component between the first color signal value corresponding to the selected color and the reference color signal value defining the selected color. In step (e), a measure of accuracy is computed using the color difference component between a second corrected color signal value which is obtained by correcting a first color signal value corresponding to a color other than the selected color using the color correction parameter and the reference color signal value that defines the color other than the selected color. In step (f), accuracy of correction is determined by comparing the measure of accuracy to a predetermined accuracy criterion.

If the accuracy is determined not to satisfy a predetermined accuracy in the step (f), step (g) may be performed to further select a color other than the selected color based on comparison of magnitude of the color difference components between the second corrected color signal values and reference color signal values defining colors other than the selected color determined in the step (e), and the steps (d), (e), and (f) may be executed again.

In one aspect, the step (g) is a step of selecting colors in descending order of the magnitude of the color difference components between the second corrected color signal values and reference color signal values defining colors other than the selected color determined in the step (e).

In one aspect, the step (a) includes step (a1) of obtaining the plurality of first color signal values by photographing the color chart.

The plurality of reference color signal values may be signal values obtained by measuring the colors of the plurality of color patches.

In one aspect, the step (c) is a step of selecting colors in descending order of the magnitude of the color difference components determined in step (b).

The plurality of first color signal values and the plurality of reference color signal values may be coordinate values in CIE 1976 L*a*b* color space.

The color correction parameter computed in the step (d) may be a parameter defined so that the color difference component between the first corrected color signal value and the reference color signal value defining the selected color is 0.

In one aspect, the step (e) includes step (e1) of computing, for each one of colors other than the selected color, the color difference component between a corresponding one of the second corrected color signal values and a corresponding reference color signal value that defines the color other than the selected color, and step (e2) of computing an average value of the color difference components determined in the step (e1) and setting the average value as the measure of accuracy.

In one aspect, the step (e) includes step (e1) of computing, for each one of colors other than the selected color, the color difference component between a corresponding one of the second corrected color signal values and a corresponding reference color signal value that defines the color other than the selected color, and step (e3) of extracting a maximum value of the color difference components determined in the step (e1) and setting the maximum value as the measure of accuracy.

In one aspect, the step (e) includes step (e1) of computing, for each one of colors other than the selected color, the color difference component between a corresponding one of the second corrected color signal values and a corresponding reference color signal value that defines the color other than the selected color; step (e2) of computing an average value of the color difference components determined in the step (e1); step (e3) of extracting a maximum value of the color difference components determined in the step (e1); and step (e4) of setting a weighted sum of the average value and the maximum value as the measure of accuracy.

A color correction parameter computation device according to another aspect of the present disclosure includes one or more processors, and a memory in which a program to be executed by the one or more processors is stored. The program includes instructions for executing a process including steps (a) to (f). In step (a), a plurality of first color signal values that respectively correspond to colors of a plurality of color patches and are obtained by photographing a color chart having the color patches on a surface, and a plurality of reference color signal values respectively defining the colors of the color patches are obtained. In step (b), for each one of the colors of the color patches, a color difference component between a corresponding one of the first color signal values and a corresponding one of the reference color signal values is computed. In step (c), one or more of the colors of the color patches is selected based on comparison of magnitude of the color difference components obtained in the step (b). In step (d), a color correction parameter is computed using the first color signal value corresponding to the selected color and the reference color signal value that defines the selected color. The color correction parameter is a parameter that makes the color difference component between a first corrected color signal value which is obtained by correcting the first color signal value corresponding to the selected color using the color correction parameter and the reference color signal value defining the selected color smaller than the color difference component between the first color signal value corresponding to the selected color and the reference color signal value defining the selected color. In step (e), a measure of accuracy is computed using the color difference component between a second corrected color signal value which is obtained by correcting a first color signal value corresponding to a color other than the selected color using the color correction parameter and the reference color signal value that defines the color other than the selected color. In step (f), accuracy of correction is determined by comparing the measure of accuracy to a predetermined accuracy criterion.

In one aspect, the program further includes instructions for executing step (g) and, after executing the step (g), executing the steps (d), (e), and (f). In step (g), if the accuracy is determined not to satisfy a predetermined accuracy in the step (f), a color other than the selected color is further selected based on comparison of magnitude of the color difference components between the second corrected color signal values and reference color signal values defining colors other than the selected color determined in the step (e).

In one aspect, the step (g) is a step of selecting colors in descending order of the magnitude of the color difference components between the second corrected color signal values and reference color signal values defining colors other than the selected color determined in the step (e).

In one aspect, the step (c) is a step of storing in the memory a list of a pair of the first color signal value corresponding to the selected color and the reference color signal value defining the selected color based on comparison of the magnitude of the color difference components determined in step (b).

An image output system according to still another aspect of the present disclosure includes an image capture device, a color correction device that receives image information obtained by the image capture device and color correction parameters computed by a color correction parameter computation device and performs color correction to the image information, and an output device that displays or prints an output from the color correction device. The color correction parameter computation device includes one or more processors, and a memory in which a program to be executed by the one or more processors is stored. The program includes instructions for executing a process including steps (a) to (f). In step (a), a plurality of first color signal values that respectively correspond to colors of a plurality of color patches and are obtained by photographing a color chart having the color patches on a surface using the image capture device, and a plurality of reference color signal values respectively defining the colors of the color patches are obtained. In step (b), for each one of the colors of the color patches, a color difference component between a corresponding one of the first color signal values and a corresponding one of the reference color signal values is computed. In step (c), at least one color of the color patches is selected based on comparison of magnitude of the color difference components obtained in the step (b). In step (d), a color correction parameter is computed using the first color signal value corresponding to the selected color and the reference color signal value that defines the selected color. The color correction parameter is a parameter that makes the color difference component between a first corrected color signal value which is obtained by correcting the first color signal value corresponding to the selected color using the color correction parameter and the reference color signal value defining the selected color smaller than the color difference component between the first color signal value corresponding to the selected color and the reference color signal value defining the selected color. In step (e), a measure of accuracy is computed using the color difference component between a second corrected color signal value which is obtained by correcting a first color signal value corresponding to a color other than the selected color using the color correction parameter and the reference color signal value that defines the color other than the selected color. In step (f), accuracy of correction is determined by comparing the measure of accuracy to a predetermined accuracy criterion. The color correction device performs the color correction using the color correction parameters.

These general or specific aspects may be implemented as a system, a device, a method, an integrated circuit, a computer program, a recording medium, or any selective combination thereof.

The embodiments of the present disclosure will now be described in detail with reference to drawings.

First Embodiment

Image Output System

FIG. 1 generally illustrates an exemplary image output system according to the first embodiment of the present disclosure. An image output system 20000 shown in FIG. 1 includes an image capture device 200, a color correction device 600, and an output device 700. As shown in FIG. 1, the image output system 20000 may further include a color correction parameter storage device 500.

The image capture device 200 is an apparatus capable of capturing images of a subject, such as a digital camera. The image capture device 200 may also be an image scanner, an electronic endoscope, a copier, or the like. It is illustrated as a digital still camera herein.

The image capture device 200 has an image sensor. The image sensor may be a charge coupled device (CCD) image sensor, a complementary metal oxide semiconductor (CMOS) image sensor, or a metal oxide semiconductor (MOS) image sensor, for example. Through photoelectric conversion in the image sensor, an analog signal is generated. The analog signal is converted to a digital signal by an A/D converter. The digital signal undergoes such processes as color separation for generating an RGB signal, white balance correction for adjusting the R, G, and B gains with respect to a white reference value, and gray level correction for adjusting the gray level so as to compensate for the γ-characteristics of the output device 700. The image capture device 200 thus generates an RGB signal as an image signal. The RGB signal is compliant to the color gamut defined by the standard RGB (sRGB) standard, for example. The RGB signal is not limited to a signal compliant to the color gamut defined by the sRGB standard, of course; it may be a signal compliant to the color gamut defined by Adobe RGB or other standards, for example. Hereinafter, an RGB signal compliant to the color gamut defined by the sRGB standard will sometimes be called just an "sRGB signal". The sRGB signal is output to the color correction device 600. In the color correction device 600, the color correction process described below is applied to the sRGB signal.

The color correction device 600 receives image information obtained by the image capture device 200 and performs color correction to the image information. Image information is information for reproducing an image of the subject taken by the image capture device. Herein, the image information is sRGB signals output from the image capture device 200. The image information is not limited to an image signal representing an image of the subject but may include image data representing an image of the subject, coordinate values in a color space for composing an image of the subject, and the like. The color correction device 600 reads color correction parameters stored in the color correction parameter storage device 500 described below, for example. The color correction device 600 applies color correction using color correction parameters to the image information from the image capture device 200. The color-corrected image information is output to the output device 700.

The output device 700 displays or prints the output from the color correction device 600 as a color image. The output device 700 may be a display, a projector, or a printer, for example. The output device 700 is illustrated herein as a display that supports the color gamut defined by the sRGB standard. The display can be a display device connected to a personal computer.

The color correction parameter storage device 500 is a device capable of storing color correction parameters computed by the color correction parameter computation device discussed later. The color correction parameter storage device 500 may be a known storage device, such as memory such as RAM and ROM, a magnetic disk storage device, and an optical disk storage device.

In the image output system 20000, the image capture device 200, the color correction device 600, the output device 700, and the color correction parameter storage device 500 may be independent devices or two or more of them may be integrated. For example, the color correction parameter storage device 500 may be incorporated into the color correction device 600.

<Color Correction Parameter Computation Device>

Figure 2:
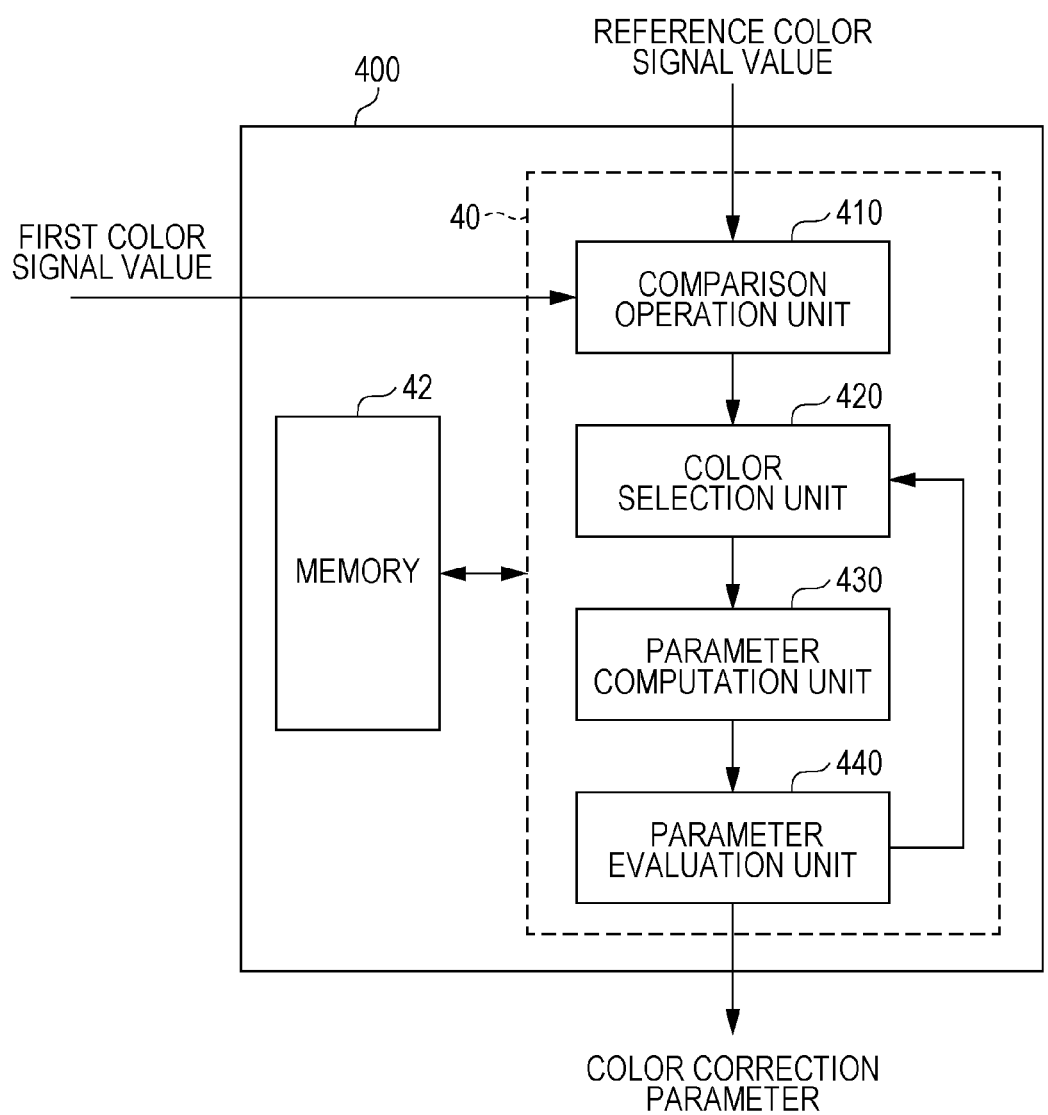
FIG. 2 is a block diagram generally showing a color correction parameter computation device in the first embodiment of the present disclosure.

FIG. 2 generally shows the color correction parameter computation device 400 in the first embodiment of the present disclosure. The color correction parameter computation device 400 includes at least one processor and at least one memory. In the memory, a program to be executed by the processor included in the color correction parameter computation device 400 is stored. The program stored in the memory is a program for computing color correction parameters. The memory is not limited to RAM or ROM but may be any known storage device.

In the configuration shown in FIG. 2, the color correction parameter computation device 400 includes a processor 40 that includes a comparison operation unit 410, a color selection unit 420, a parameter computation unit 430, and a parameter evaluation unit 440. To the comparison operation unit 410, first color signal values and reference color signal values, which are described later, are input. The comparison operation unit 410, the color selection unit 420, the parameter computation unit 430, and the parameter evaluation unit 440 may be separate processors or two or more of them may be included in a single processor. In the illustrated example, the color correction parameter computation device 400 also includes a memory 42 in which a program for computing color correction parameters is stored. The color correction parameter computation device 400 may be entirely or partially implemented as a digital signal processor (DSP) or an application specific integrated circuit (ASIC). The processor 40 may include the memory 42 as a part thereof. The operations of the components of the color correction parameter computation device 400 and the program will be discussed in detail later.

Figure 3:
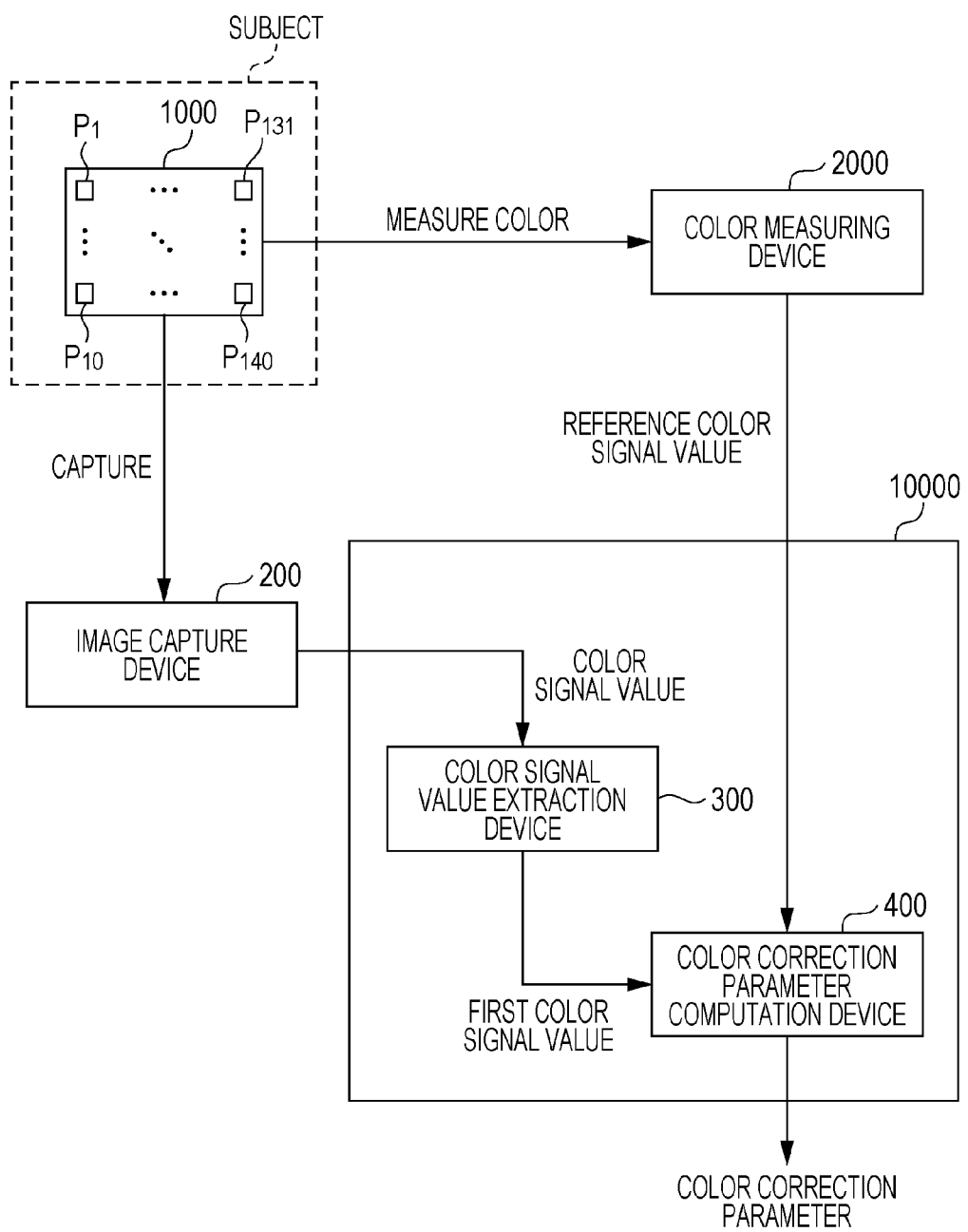
FIG. 3 is a block diagram illustrating an example of usage of the color correction parameter computation device in the first embodiment of the present disclosure.

FIG. 3 is a block diagram illustrating an example of usage of the color correction parameter computation device 400 in the first embodiment of the present disclosure. As described below, in computation of color correction parameters, a color chart having multiple color patches on its surface is photographed. Typically, the colors of the color patches, to be used as the references for color correction, are also measured. The photographing and/or color measurement of the color patches may be done either at the time of computation of color correction parameters or in advance. The portion indicated by a broken line in FIG. 3 schematically represents the range of an image to be captured by photographing (may sometimes be called a "subject").

A color chart 1000 shown in FIG. 3 has multiple color patches on its surface. Among the color patches, the chroma and the hue gradually vary. For the color chart 1000, ColorChecker® Digital SG manufactured by X-Rite is used herein by way of illustration. The ColorChecker Digital SG has color patches $P_1$ to $P_{140}$ of 140 colors on its surface. Of the color patches $P_1$ to $P_{140}$, color patches $P_{12}$-$P_{19}$, $P_{22}$-$P_{29}$, $P_{32}$-$P_{39}$, $P_{42}$-$P_{44}$, $P_{47}$-$P_{49}$, $P_{52}$-$P_{54}$, $P_{57}$-$P_{59}$, $P_{62}$-$P_{64}$, $P_{67}$-$P_{69}$, $P_{72}$-$P_{74}$, $P_{77}$-$P_{79}$, $P_{82}$-$P_{84}$, $P_{87}$-$P_{89}$, $P_{92}$-$P_{94}$, $P_{97}$-$P_{99}$, $P_{102}$-$P_{109}$, $P_{112}$-$P_{119}$, $P_{122}$-$P_{129}$, and $P_{132}$-$P_{139}$ are chromatic colors. The other color patches are achromatic colors.

The color chart 1000 is not limited to ColorChecker Digital SG but may be any color chart with the colors of multiple color patches uniformly distributed in a uniform color space. The color chart 1000 may also be a Macbeth color chart or a JIS standard color chart, for example.

Photographing of the color chart 1000 is conducted using the image capture device 200. An image signal (or alternatively image data) output by the image capture device 200 contains information about the colors of the color patches on the color chart 1000. The image signal generated by photographing the color chart 1000 with the image capture device 200 is sent to a color signal value extraction device 300.

From the image signal received from the image capture device 200, the color signal value extraction device 300 extracts first color signal values $C_1$ to $C_{140}$ respectively corresponding to the colors of the color patches $P_1$ to $P_{140}$. Note that as used herein, the term "color signal value" means an image signal containing color information (for example, an sRGB signal) or coordinate values in a color space. The first color signal values $C_1$ to $C_{140}$ are sRGB signals herein.

The first color signal values $C_1$ to $C_{140}$ may be extracted in any manner. For example, the positional relationship between the image capture device 200 and the color chart 1000 at the time of photographing is adjusted so that the color chart 1000 is captured at a predetermined position in the resulting image. Since the positions of the individual color patches in the image are then known, color signal values corresponding to the positions of the color patches in the image can be extracted. Alternatively, a program may be created which automatically recognizes the positions of the color patches $P_1$ to $P_{140}$ in the image and extracts the first color signal values $C_1$ to $C_{140}$. Such a program may be stored in memory so that processing based on the program is executed by the color signal value extraction device 300.

The first color signal values $C_1$ to $C_{140}$ extracted by the color signal value extraction device 300 are input to the color correction parameter computation device 400. The color correction parameter computation device 400 thereby acquires the first color signal values ($C_1$ to $C_{140}$) respectively corresponding to the colors of the color patches. As shown in FIG. 3, the color correction parameter computation system 10000 can be said to be formed of the color signal value extraction device 300 and the color correction parameter computation device 400, for example. The color correction parameter computation system 10000 may include other additional devices.

As noted above, the colors of the color patches may also be measured in computation of color correction parameters. The colors of the color patches are measured using a color measuring device 2000 as shown in FIG. 3. The color measuring device 2000 may be a colorimeter, for example. Using a colorimeter, correct RGB signals (sRGB signals in the current example) indicating the colors of the target object (color patches in the current example) can be obtained. A spectrophotometer may also be used instead of a colorimeter.

The color measurement yields reference color signal values $C^{ref}_1$ to $C^{ref}_{140}$ that respectively define the colors of the color patches. The reference color signal values $C^{ref}_1$, to $C^{ref}_{140}$ are sRGB signals herein.

The reference color signal values $C^{ref}_1$ to $C^{ref}_{140}$ produced by color measurement with the color measuring device 2000, for example, are input to the color correction parameter computation device 400. The color correction parameter computation device 400 thereby acquires the reference color signal values ($C^{ref}_1$ to $C^{ref}_{140}$) respectively defining the colors of the color patches. The color values of color patches are sometimes known in advance. For example, some color chart manufacturers provide RGB values indicative the colors of color patches. The RGB values obtained from the color chart manufacturer may then be used as reference color signal values input to the color correction parameter computation device 400, thereby omitting the color measurement process.

The colors of the color patches are typically measured under similar environmental conditions (lighting conditions) to the conditions under which the color chart is photographed using the image capture device 200. This enables correct reproduction of colors included in the real scene on a display. It is also possible to photograph the color chart with the image capture device 200 under a certain environmental condition A and measure the colors of the color patches under environmental condition B that is different from condition A. In such an implementation, color correction parameters for reproducing colors that would be perceived in a scene under the environmental condition B on a display can be computed. For instance, the color chart is photographed using the image capture device 200 under an illumination light source ILa. The colors of the color patches are also measured under an illumination light source ILb having a luminous intensity lower than that of the illumination light source ILa. Using first color signal values and reference color signal values thus obtained, color correction parameters are computed. Suppose now that an object is photographed under an illumination light source other than the illumination light source ILb using the image capture device 200. Then, color correction using the aforementioned color correction parameters enables reproduction of the colors that would be perceived from the object when observed under the illumination light source ILb on a display without actually photographing the object under the illumination light source ILb. In this way, an environmental condition under which one wants to reproduce colors may be established and the colors of the color patches may be measured under that condition.

<Color Correction Parameter Computation Method>

Figure 4:
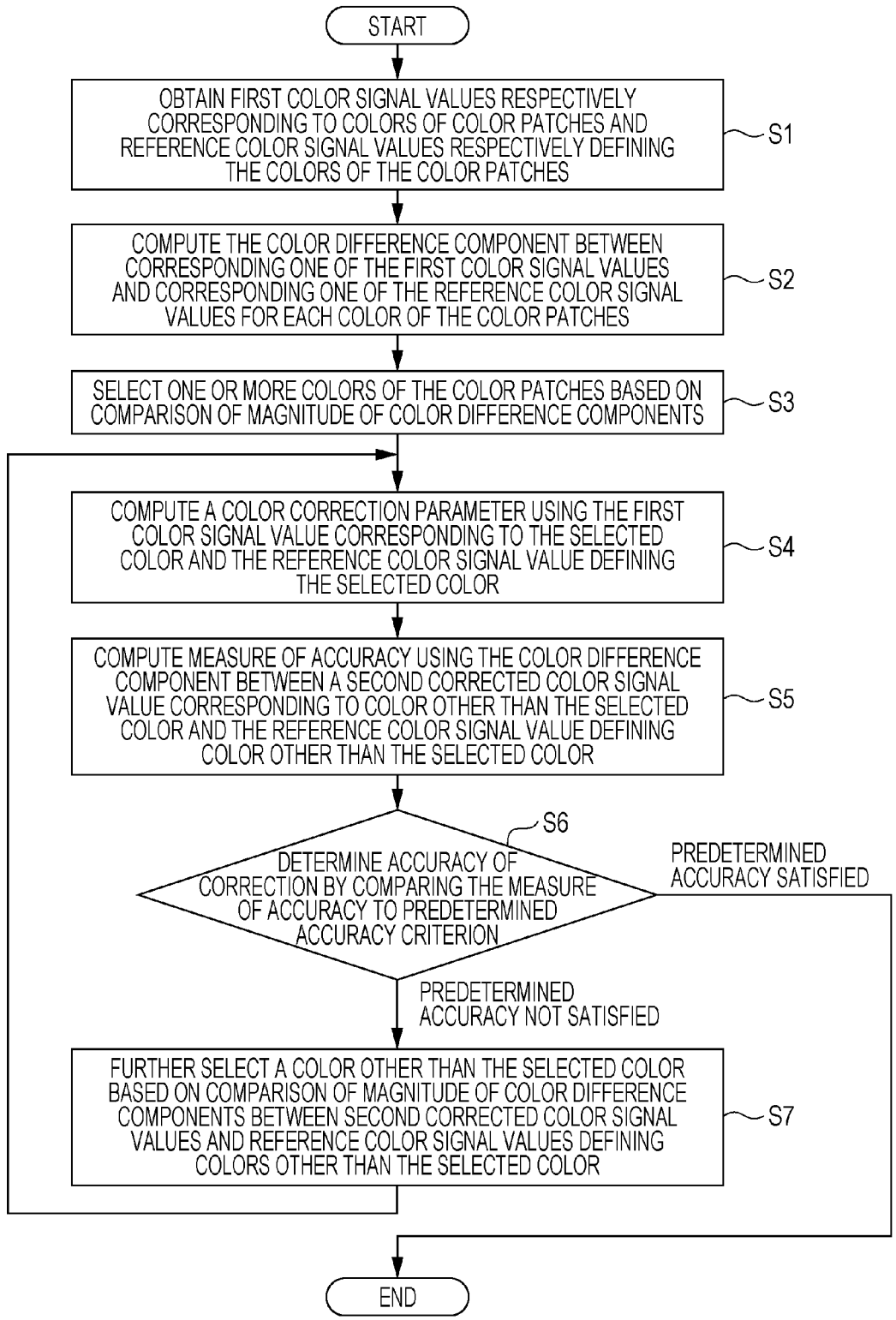
FIG. 4 is a flowchart generally illustrating an exemplary color correction parameter computation method according to the present disclosure.

Next, a specific example of the color correction parameter computation method will be described. Referring to FIG. 4, an exemplary color correction parameter computation method according to the present disclosure will be generally described first.

FIG. 4 generally illustrates an example of the color correction parameter computation method according to the present disclosure.

In step S1, first color signal values respectively corresponding to the colors of the color patches and reference color signal values respectively defining the colors of the color patches are obtained. The first color signal values can be obtained by photographing the color chart.

In step S2, for each one of the colors of the color patches, the color difference component between a corresponding one of the first color signal values and a corresponding one of the reference color signal values is calculated. Calculation of the color difference component will be discussed later.

In step S3, one or more of the colors of the color patches are selected based on comparison of the magnitude of the color difference components.

In step S4, a color correction parameter is computed using the first color signal value corresponding to the selected color and the reference color signal value that defines the selected color. The color correction parameter is such a parameter that makes the color difference component between a first corrected color signal value and the reference color signal value defining the selected color smaller than the color difference component between the first color signal value corresponding to the selected color and the reference color signal value defining the selected color. The first corrected color signal value is obtained by correcting the first color signal value corresponding to the selected color using the color correction parameter.

In step S5, a measure of accuracy is computed using the color difference component between a second corrected color signal value and a reference color signal value that defines a color other than the selected color. The second corrected color signal value is obtained by correcting a first color signal value corresponding to a color other than the selected color using the color correction parameter.

In step S6, the accuracy of correction is determined by comparing the measure of accuracy to a predetermined accuracy criterion.

Step S7 may be executed as necessary. In step S7, a color other than the selected color is further selected based on comparison of the magnitude of the color difference components between the second corrected color signal values and reference color signal values defining colors other than the selected color. Thereafter, steps S4 through S6 are executed again.

Referring again to FIG. 2, the flow of processing in the color correction parameter computation device 400 will be described in greater detail.

<Step (a) for Obtaining Reference Color Signal Values and First Color Signal Values>

The comparison operation unit 410 first acquires the reference color signal values $C^{ref}_1$ to $C^{ref}_{140}$ and the first color signal values $C_1$ to $C_{140}$ which are output from, for example, the color signal value extraction device 300. The reference color signal values $C_1$ to $C_{140}$ can be color signal values generated by color measurement using the color measuring device 2000. The first color signal values $C_1$ to $C_{140}$ and the reference color signal values $C^{ref}_1$ to $C^{ref}_{140}$ have to be obtained only once at the start of the process of color correction parameter computation.

<Step (b) for Computing Color Difference Component $\Delta E_i$ Per Color Patch Color>

The comparison operation unit 410 applies Equation (1) below to compute color difference components $\Delta E_1$ to $\Delta E_{140}$ between the first color signal values and the corresponding reference color signal values respectively for the colors of the color patches. When used herein, the term "color difference component" refers to a quantity or distance calculated with color signal values and is not limited to a geometric distance in a color space.

$$\Delta E_i = \{(\Delta R_i)^2 + (\Delta G_i)^2 + (\Delta B_i)^2\}^{\frac{1}{2}} \quad (1)$$

In Equation (1), i is an index indicating each color patch, where i=1, 2, ... 140 in the current example. $\Delta R_i$, $\Delta G_i$, and $\Delta B_i$ are $\Delta R_i = R^{ref}_i - R_i$, $\Delta G_i = G^{ref}_i - G_i$, and $\Delta B_i = B^{ref}_i - B_i$, respectively. The reference color signal value $C^{ref}_i$ and the first color signal value $C_i$ corresponding to the i-th color patch are represented here as $(R^{ref}_i, G^{ref}_i, B^{ref}_i)$ and $(R_i, G_i, B_i)$, respectively.

In the description below, the pair of the reference color signal value $C^{ref}_i$ and the first color signal value $C_i$ corresponding to color patch $P_i$ will be referred to as data set $D_i$ corresponding to the color patch $P_i$. The comparison operation unit 410 outputs the value of the color difference component $\Delta E_i$ and the data set $D_i$ to the color selection unit 420.

<Step (c) for Selecting One or More of the Colors of the Color Patches>

The color selection unit 420 compares the magnitude of the color difference component $\Delta E_i$ it received. The color selection unit 420 further selects one or more of the colors of color patches $P_i$ based on the comparison of the magnitude of $\Delta E_i$. As used herein, "selecting one or more of the colors of the color patches" means making it possible to identify which color has been selected. For example, variable values indicating which colors have been selected may be established and such a value being stored in the memory 42 or the like may mean that the corresponding color has been selected. For example, the color selection unit 420 finds the maximum color difference component $\Delta E_{max}$ among $\Delta E_1$ to $\Delta E_{140}$ and adds the value of index i indicating the color patch corresponding to $\Delta E_{max}$ (supposing i=13) and data set $D_i$ (supposing $D_{13}$) to a selected color list. The selected color list is stored in the memory 42 for example. The index value for the color patch corresponding to $\Delta E_{max}$ (i=13) and the data set $D_{13}$ being present in the selected color list indicates a state in which at least one of the colors of the color patches $P_i$ has been selected.

The number of colors to be selected by the color selection unit 420 is not limited to one; for example, it may select two or more colors in descending order of the magnitude of the color difference components. For the purpose of illustration, the following description supposes that $\Delta E_{max}$ is $\Delta E_{14}$ and the second largest color difference component to $\Delta E_{max}$ is $\Delta E_{54}$ so that the index values for the color patches corresponding to $\Delta E_{13}$ and $\Delta E_4$ (i=13, 54), and data sets $D_{13}$, $D_{54}$ have been added to the selected color list. Two or more data sets $D_i$ may be added to the selected color list as in the illustrated example. According to the present disclosure, however, there will never be a case where all of the colors of color patches $P_i$ are selected in the step of selecting at least one of the colors of the color patches $P_i$. The color selection unit 420 outputs the selected color list and the data sets $D_1$ to $D_{140}$ to the parameter computation unit 430.

<Step (d) for Computing Color Correction Parameters>

The parameter computation unit 430 computes color correction parameters using the first color signal values corresponding to the colors selected from the colors of the color patches $P_i$ ($C_{13}$ and $C_{54}$ in the current example) and the reference color signal values that define the selected colors ($C^{ref}_{13}$ and $C^{ref}_{54}$). In the illustrated example, the parameter computation unit 430 computes color correction parameters using the data sets included in the selected color list provided from the color selection unit 420 ($D_{13}$ and $D_{54}$ in the current example). A color correction parameter is a parameter that makes the color difference component between the first corrected color signal value described below and the reference color signal value defining a selected color smaller than the color difference component ($\Delta E_{13}$ and $\Delta E_{54}$ in the current example) between the first color signal value corresponding to the selected color and the reference color signal value defining the selected color. The first corrected color signal value is obtained by correcting the first color signal value corresponding to a selected color (each of $C_{13}$ and $C_{54}$ in the current example) using the color correction parameter.

Computing a parameter like the color correction parameter according to the present disclosure can be said to be equivalent to calculating a parameter (a coefficient) for a prepared model. According to Kanatani Kenichi, "Geometric Inference from Images and Model Selection", Technical Report of the Institute of Electronics, Information and Communication Engineers, a model refers to a formula that includes an unknown parameter introduced for estimating the real structure from signal values with errors. When a corrected value generated by correction is denoted as $C^{es}$, the model is represented using function f as shown in Equation (2) below:

$$C^{es} = f(C) \quad (2)$$

In Equation (2), C is the set of input signal values and $C^{es}$ is the set of corrected signal values. In the first embodiment, C and $C^{es}$ are both sRGB signals and represented as (R,G,B) and ($R^{es}$,$G^{es}$,$B^{es}$), respectively.

In the specific example described here, the color adjustment scheme proposed by Tezuka, Ikeda, Hirashima, Inoue, and Shimizu: "A Color Correction Method by Utilizing the Color Space Transformation", Transactions of Information Processing Society of Japan, Vol. 39, No. 3, March 1998, pp. 586-588, is utilized as the color correction model. A specific equation for this color adjustment scheme is shown in Equation (3). In Equation (3), the first color signal value in the k-th data set included in the selected color list is denoted as $T_k$.

$$c_i^{es} = \sum_{k=1}^{S} I(C_i, T_k) \cdot Q_k + C_i \quad (3)$$

In Equation (3), k is an index indicating a color selected from the colors of color patches $P_i$, and S is the total number of currently selected colors. In the illustrated example, S represents the total number of data sets included in the selected color list, specifically, S=2. That is to say, $T_1=C_{13}$ and $T_2=C_{54}$ in this example.

$C^{es}_i$ in Equation (3) represents a corrected color signal value (a first corrected color signal value) resulting from correction of the i-th first color signal value $C_i$. In the illustrated example, the first corrected color signal value $C^{es}_i$ is an sRGB signal, represented as ($R^{es}_i$,$G^{es}_i$,$B^{es}_i$).

The function $I(C_i,T_k)$ in Equation (3) is a function for introducing an influence quantity corresponding to the degree of separation between a certain first color signal value to be corrected and the first color signal value in the k-th data set included in the selected color list, as discussed in greater detail later. A specific example of function I in Equation (3) is shown in Equation (4) below.

$$I(C_i, T_k) = \begin{cases} 1 - \dfrac{e(C_i, T_k)}{10000} & (e(C_i, T_k) < 10000) \\ 0 & (e(C_i, T_k) \geq 10000) \end{cases} \quad (4)$$

The function $e(C_i,T_k)$ in Equation (4) is a function represented by Equation (5), for example. In Equation (5), $T_k$ is represented as ($R_k$,$G_k$,$B_k$).

$$e(C_i,T_k) = \{(R_i-R_k)^2 + (G_i-G_k)^2 + (B_i-B_k)^2\}^{1/2} \quad (5)$$

As can be understood from Equation (5), the function $e(C_i,T_k)$ indicates the degree of separation between one first color signal value $C_i$ and the first color signal value $T_k$ in the k-th data set included in the selected color list. That is, $I(C_i,T_k)$ in Equation (4) is a function introduced for giving a weight based on the degree of separation between one first color signal value $C_i$ and the first color signal value $T_k$ in the k-th data set included in the selected color list. The function $I(C_i,T_k)$ is not limited to the example of Equation (4), but can be established as appropriate so as to achieve desired weighting.

As can be understood from Equation (3), the first corrected color signal value $C^{es}_i$ obtained by application of Equation (3) is equivalent to the first color signal value $C_i$ shifted by a certain amount. The amount of this shift is the sum of $C_i$ and $Q_k$ weighted as a function of the degree of separation between the first color signal value concerned and each first color signal value $T_k$ in a data set included in the selected color list. In correspondence to the presence of R, G, and B components in $C_i$ and $C^{es}_i$, $Q_k$ in Equation (3) also has R, G, and B components.

Computation of a parameter in embodiments of the present disclosure is determining $Q_k$ in Equation (3). In the following description, $Q_k$ in Equation (3) may sometimes be called "the amount of shift".

The amount of shift $Q_k$ is specifically computed as follows. First, the amount of adjustment $P_k$ determined as $P_k = T^{ref}_k - T_k$ is defined. $T^{ref}_k$ represents the reference color signal value in the k-th data set included in the selected color list. As will be understood from the above definition, the amount of adjustment $P_k$ is the difference between the reference color signal value ($C^{ref}_k$) and the first color signal value ($C_k$) in the k-th data set included in the selected color list. The amount of adjustment $P_k$ is represented here as ($R^{ref}_k - R_k$, $G^{red}_k - G_k$, $B^{ref}_k - B_k$). The amount of adjustment $P_k$ is defined for the S data sets included in the selected color list.

$C_i$ in the right side of Equation (3) is transposed to the left side and index i in Equation (3) is rewritten as h for the convenience of calculation. Given a constraint that makes the first corrected color signal value $C^{es}_h$ obtained with Equation (3) agree with the reference color signal value $C^{ref}_h$ with regard to the data sets included in the selected color list, since the left side represents the amount of adjustment mentioned above, Equation (6) below is yielded:

$$P_h = \sum_{k=1}^{S} I(C_h, T_k) \cdot Q_k \quad (6)$$

In Equation (6), h=1, 2, ..., S. Representing Equation (6) using a matrix yields Equation (7) below:

$$\begin{bmatrix} P_1 \\ \vdots \\ P_S \end{bmatrix} = \begin{bmatrix} l_{1,1} & \cdots & l_{1,S} \\ \vdots & \ddots & \vdots \\ l_{S,1} & \cdots & l_{S,S} \end{bmatrix} \begin{bmatrix} Q_1 \\ \vdots \\ Q_S \end{bmatrix} \quad (7)$$

For avoiding complication, $I(C_h,T_k)$ is denoted as $I_{h,k}$ in Equation (7). Further modifying Equation (7) yields Equation (8) below. The amount of shift $Q_k$ is thereby determined. In computation of the amount of shift $Q_k$ by Equation (8), calculation is carried out separately for the R, G, and B components using a common inverse matrix by which a vector $(P_1, \ldots, P_S)^t$ is multiplied from the left.

$$\begin{bmatrix} Q_1 \\ \vdots \\ Q_S \end{bmatrix} = \begin{bmatrix} l_{1,1} & \cdots & l_{1,S} \\ \vdots & \ddots & \vdots \\ l_{S,1} & \cdots & l_{S,S} \end{bmatrix}^{-1} \begin{bmatrix} P_1 \\ \vdots \\ P_S \end{bmatrix} \quad (8)$$

The parameter computation unit 430 computes parameter $Q_k$ using data sets included in the selected color list in this manner. As is apparent from the constraint introduced in the derivation of Equation (8), the parameter $Q_k$ obtained by application of Equation (8) is a parameter defined so that the color difference component between the reference color signal value $C^{ref}_h$ defining a color selected by the color selection unit 420 and the first corrected color signal value $C^{ref}_h$ is 0. The color difference component between the reference color signal value $C^{ref}_h$ and the first corrected color signal value $C^{ref}_h$ does not have to be strictly 0; it has to be 0 only within the range of accuracy of values used for numerical value calculations. After computing the parameter $Q_k$, the parameter computation unit 430 outputs the parameter $Q_k$, the selected color list, and the data sets $D_1$ to $D_{140}$ to the parameter evaluation unit 440.

As is apparent from the above, the first corrected color signal value $C^{es}_h$ obtained by correcting a first color signal value $C_h$ ($C_{13}$ and $C_{54}$ in this example) in a data set included in the selected color list using a color correction parameter determined with the aforementioned color adjustment scheme model agrees with the reference color signal value $C^{ref}_h$. A corrected color signal value obtained by correcting the first color signal value $C_i$ in a data set that is not included in the selected color list using a color correction parameter determined with the color adjustment scheme model depends on the first color signal value $C_i$ in a data set included in the selected color list and parameter $Q_k$.

<Step (e) for Computing the Measure of Accuracy Using Color Difference Component $\Delta E^e_j$>

The parameter evaluation unit 440 determines the accuracy of correction.

In brief outline, the parameter evaluation unit 440 performs correction to each first color signal value $C_i$ ($i \ne 13, 54$ in the current example) corresponding to a color that was not selected by the color selection unit 420 among the colors of the color patches $P_i$ using parameter $Q_k$ ($Q_1$ and $Q_2$ in the current example) to obtain a second corrected color signal value. The parameter evaluation unit 440 further computes a measure of accuracy using the color difference component between the second corrected color signal value and each reference color signal value $C^{ref}_i$ ($i \ne 13, 54$ in this example) that defines a color that was not selected by the color selection unit 420 among the colors of the color patches $P_i$. The parameter evaluation unit 440 determines the accuracy of correction by comparing the resulting measure of accuracy to a predetermined accuracy criterion c.

More specifically, the parameter evaluation unit 440 computes the second corrected color signal value $C^{es}_j$ by applying Equation (3) to a first color signal value $C_j$ that corresponds to a color that was not selected by the color selection unit 420 among the colors of the color patches. Here, the index j indicates a color that was not selected by the color selection unit 420 among the colors of the color patches. The first color signal value $C_j$ in the illustrated example is a color signal value that corresponds to a color not included in the selected color list. Letting N denote the total number of colors that were not selected by the color selection unit 420 among the colors of the color patches, then j=1, 2, ..., N, where N=138 in this example.

The parameter evaluation unit 440 computes a measure of accuracy $\Delta E^A$ next. The measure of accuracy $\Delta E^A$ is calculated by Equation (9) below, for example:

$$\Delta E^A = \frac{\sum_{j=1}^{N} \Delta E^e_j}{N} \quad (9)$$

In Equation (9), $\Delta E^e_j$ is the color difference component between the second corrected color signal value $C^{es}_j$ and the reference color signal value $C^{ref}_j$ defining a color that was not selected by the color selection unit 420. This color difference component $\Delta E^e_j$ is represented by Equation (10) below:

$$\Delta E^e_j = \{(\Delta R^e_j)^2 + (\Delta G^e_j)^2 + (\Delta B^e_j)^2\}^{\frac{1}{2}} \quad (10)$$

In Equation (10), $\Delta R^e_j = R^{ref}_j - R^{es}_j$, $\Delta G^e_j = G^{ref}_j - G^{es}_j$, and $\Delta B^e_j = B^{ref}_j - B^{es}_j$. Accordingly, the measure of accuracy $\Delta E^A$ is the average of the color difference components between the corrected color signal values and the reference color signal values in the data sets that are not included in the selected color list. Here, the summation in Equation (9) is determined for the total number of data sets that are not included in the selected color list.

<Step (f) for Determining the Accuracy of Correction by Comparison of the Measure of Accuracy with Accuracy Criterion $\epsilon$>

The parameter evaluation unit 440 then compares the value of the color difference component $\Delta E^A$ with the value of a predetermined accuracy criterion c to determine the accuracy of correction. The value of accuracy criterion E is stored in the memory 42, for example. The value of accuracy criterion c may be set to any appropriate value.

When $\Delta E^A \le \epsilon$ is satisfied, the accuracy of correction can be determined to be sufficient. The parameter evaluation unit 440 accordingly outputs the parameter $Q_k$ already determined ($Q_{13}$ and $Q_{54}$ in the current example). That is, the color correction parameter computation device 400 ends calculation and outputs parameter $Q_k$ as the color correction parameter. The color correction parameters may be stored in the color correction parameter storage device 500 shown in FIG. 1, for example. The color correction parameters may be stored in the memory 42 (see FIG. 2) instead.

When $\Delta E^A > \epsilon$, however, the accuracy of correction can be determined not to be sufficient. The parameter evaluation unit 440 then outputs the color difference component $\Delta E^e_j$, which is determined for each of the colors that were not selected by the color selection unit 420 among the colors of the color patches, the selected color list, and the data sets $D_1$ to $D_{140}$ to the color selection unit 420.

<Step (g) for Further Selecting a Color from the Colors of the Color Patches>

The color selection unit 420 compares the magnitude of the color difference component $\Delta E^e_j$. In the current example, the color selection unit 420 compares the magnitude of color difference component $\Delta E^e_j$ corresponding to each data set $D_j$ that is not included in the selected color list with each other. Based on the comparison of the magnitude of color difference component $\Delta E^e_j$, the color selection unit 420 further selects a color from the colors of the color patches except the ones already selected by the color selection unit 420. For example, the color selection unit 420 finds the maximum $\Delta E^e_{max}$ of the color difference component $\Delta E^e_j$. Specifically, the color selection unit 420 further adds the value of index i for the color patch that corresponds to $\Delta E^e_{max}$ (for example, i=22) and the data set $D_i$ corresponding to that value of i ($D_{22}$) to the selected color list. The color selection unit 420 may thus select colors with higher priority in descending order of the magnitude of color difference component $\Delta E^e_j$. The color selection unit 420 outputs the updated selected color list and the data sets $D_1$ to $D_{140}$ to the parameter computation unit 430.

Subsequently, steps (d), (e), and (f) described above are further carried out, that is, the processing in the parameter computation unit 430 and the processing in the parameter evaluation unit 440 are executed again.

The parameter computation unit 430 acquires the updated selected color list and the data sets $D_1$ to $D_{140}$ from the color selection unit 420. This time, the parameter computation unit 430 recomputes the parameter, or the amount of shift, $Q_k$, by Equation (8) and the like using the data sets included in the updated selected color list ($D_{13}$, $D_{54}$, and $D_{22}$ in the current example). Here, k=1, 2, 3, and $T_1=C_{13}$, $T_2=C_{54}$, and $T_3=C_{22}$ in Equations (3) through (6). As new data has been added to the selected color list, the value of S at this point is 3, which means that the dimension of the matrix in which matrix elements are represented as $I_{h,k}$ in Equation (8) is larger than that in the last calculation. After computing the parameter $Q_k$, the parameter computation unit 430 outputs the parameter $Q_k$, the selected color list, and data sets $D_1$ to $D_{140}$ to the parameter evaluation unit 440. The recomputed parameters $Q_{13}$ and $Q_{54}$ differ from $Q_{13}$ and $Q_{54}$ obtained in the previous calculation.

The parameter evaluation unit 440 applies correction to each first color signal value $C_i$ corresponding to a color that was not selected by the color selection unit 420 (i≠13, 54, 22 in the current example) among the colors of the color patches $P_i$ using parameter $Q_k$ ($Q_1$, $Q_2$, and $Q_3$ in the current example) to obtain a second corrected color signal value $C^{es}_j$, where j=1, 2, ..., N, and N=137. Next the parameter evaluation unit 440 recomputes the measure of accuracy $\Delta E^A$ using the color difference component $\Delta E^e_j$ between the second corrected color signal value $C^{es}_j$ and the reference color signal value $C^{ref}_j$ that defines a color that was not selected by the color selection unit 420 among the colors of the color patches.

The parameter evaluation unit 440 then compares the new value of the color difference component $\Delta E^A$ with the value of the accuracy criterion ϵ, thereby determining the accuracy of correction. When $\Delta E^A \leq \epsilon$ is satisfied, then the parameter evaluation unit 440 outputs the new parameter $Q_k$ computed ($Q_{13}$, $Q_{54}$, and $Q_{22}$ in the current example). That is, the color correction parameter computation device 400 ends calculation and outputs the newly computed parameter $Q_k$ as the final color correction parameter.

When $\Delta E^A > \epsilon$, the parameter evaluation unit 440 outputs the color difference component $\Delta E^e_j$, the selected color list, and the data sets $D_1$ to $D_{140}$ to the color selection unit 420. Steps (d), (e), and (f) are subsequently repeated until a sufficiently high accuracy of correction is obtained. As described, in the foregoing computation method, the processing in the color selection unit 420, the parameter computation unit 430, and the parameter evaluation unit 440 is repeated until $\Delta E^A \leq \epsilon$ is satisfied. The color correction parameter computation device 400 thereby computes color correction parameters.

In the foregoing example, the measure of accuracy ($\Delta E^A$) is the average color difference component between the corrected color signal values and the reference color signal values for the data sets that are not included in the selected color list. The measure of accuracy is not limited to this example, however. For example, the maximum $\Delta E^M$ of the color difference components between the corrected color signal values and the reference color signal values for the data sets not included in the selected color list may be extracted and used as the measure of accuracy. Alternatively, the average $\Delta E^A$ and the maximum $\Delta E^M$ may be determined and a weighted sum of $\Delta E^A$ and $\Delta E^M$ may be used as the measure of accuracy.

As described above, the color correction parameter computation method according to the first embodiment of the present disclosure computes color correction parameters with selection of some of, not all of, the colors of the color patches present on the color chart. Therefore, the computational load can be reduced compared to a case in which all of the colors of the color patches are selected for computation of color correction parameters. Additionally, according to the present disclosure, calculation is terminated upon determination that sufficient accuracy of correction has been achieved, whereas the size of the matrix used for computing color correction parameters is sequentially increased upon each determination that a sufficient accuracy of correction has not been achieved. An increase in the computational load can therefore be effectively suppressed. The present disclosure can provide color correction parameters that can be computed with low workload.

In the color correction parameter computation method according to the first embodiment of the present disclosure, accuracy of correction is determined based on comparison between a predefined accuracy criterion ϵ and a measure of accuracy. The measure of accuracy is computed using the color difference component $\Delta E^e_j$, which is computed, for example, for each one of colors that were not selected by the color selection unit 420 as mentioned above. In other words, color difference components relating to those colors that were not directly used for computation of the aforementioned parameter $Q_k$ are used for determination of the accuracy of correction. Thus, color correction parameters that can extensively approximate various colors included in the scene to be reproduced to ideal colors can be produced while keeping an increase in the computational load low.

As will be understood from the computation method described above, when a color selected by the color selection unit 420 is included in the scene to be reproduced, that color can be approximated to an ideal color by performing correction using a color correction parameter obtained by the computation method. For the other colors included in the scene, approximation is carried out with certain weighting (see Equation (3)). Thus, natural color approximation can be achieved also for colors other than the ones selected by the color selection unit 420.

If a certain color should be approximated particularly accurately (hereinafter referred to as "particular color"), a specific color chart having a color patch of the particular color on the surface could be prepared. Use of such a specific color chart would achieve accurate approximation of the particular color. Alternatively, colors that should be selected with high priority may be set in advance in accordance with the purpose. For example, priority may be specified in advance for the value of index i for the color patch and data set $D_i$ that should be added to the selected color list. When the color of the sky on a sunny day is to be reproduced faithfully, for example, processing designed to select blue colors with priority may be executed.

As a further alternative, information on brightness or other conditions at the time of photographing may be obtained with a photometric sensor or the like included in the image capture device and the brightness information may be input to the color correction parameter computation device 400 with image information. The color selection unit 420 may also be adapted to automatically select priority colors utilizing information on the brightness or the like at the time of photographing. Instead of information on the brightness or the like at the time of photographing, information on the photographing mode that was selected during the photographing may be used. For example, if the image capture device was set to portrait picture mode during the image capturing, the color selection unit 420 may be adapted to automatically select colors that are suited for computation of color correction parameters capable of reproducing the human skin color more faithfully.

In general, the degree of mismatch between a color perceived from a real scene and a color perceived in a scene reproduced by a display device varies from color to color. The magnitude of the mismatch also depends on the environmental conditions at the time of photographing and individual differences among image capture devices. Since the present disclosure permits free setting of colors to be given high priority in approximation to colors in the real scene, colors suited for computation of color correction parameters can be chosen appropriately. It therefore can provide color correction parameters that can effectively reduce the mismatch between colors perceived from a real scene and colors perceived in a scene reproduced by a display device.

<Variation 1>

While reference color signal values are obtained using the color measuring device 2000 in the foregoing embodiment, reference color signal values may also be obtained by other methods.

Figure 5:
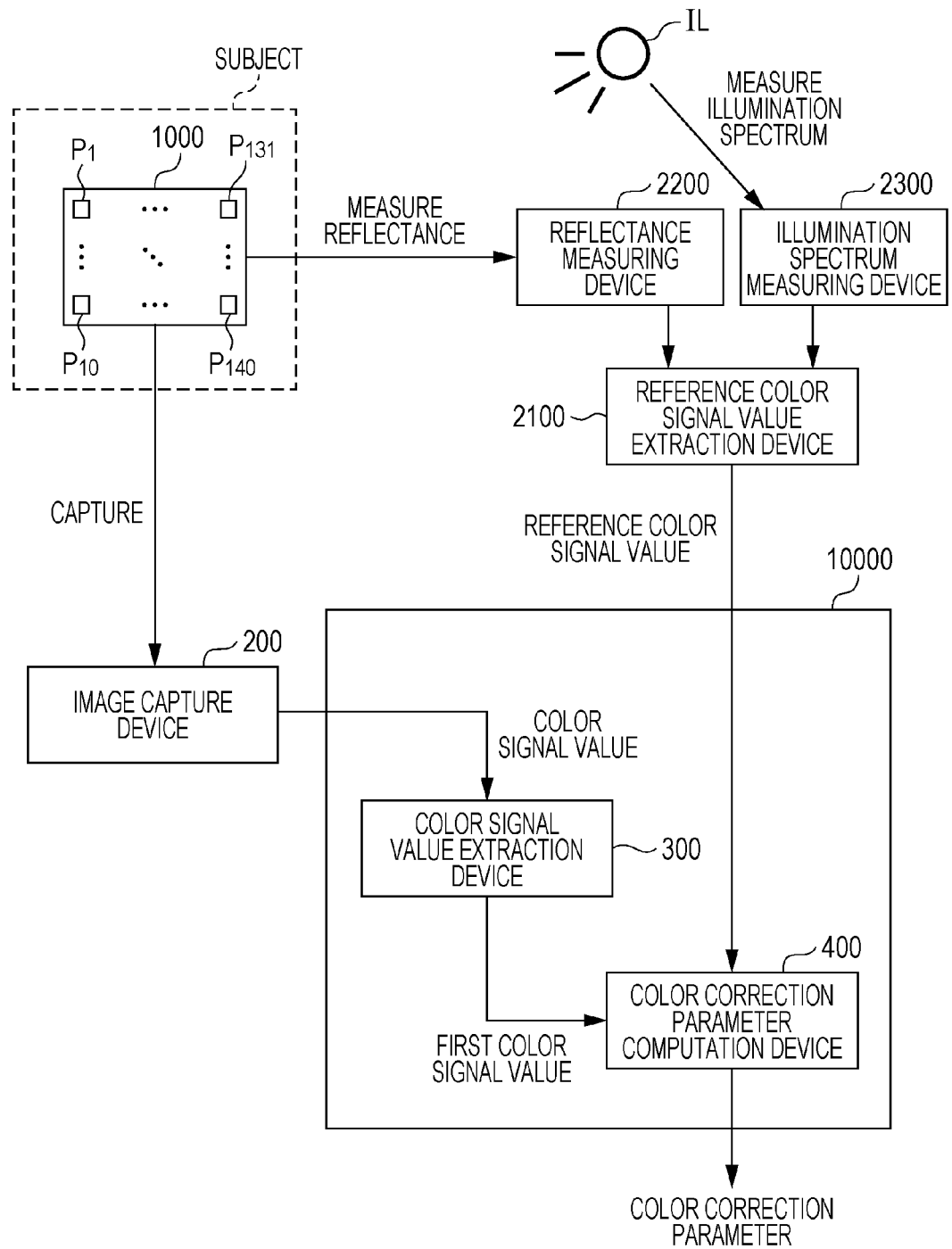
FIG. 5 is a diagram illustrating how reference color signal values can be obtained making use of the spectrum of an illumination light source and the reflectance of color patches.

FIG. 5 is a diagram illustrating how reference color signal values can be obtained making use of the spectrum of an illumination light source and the reflectance of color patches. In the configuration shown in FIG. 5, a reflectance measuring device 2200 is used to measure the reflectance of each color patch. The reflectance measuring device 2200 may be a known reflectometer. Further, an illumination spectrum measuring device 2300 is used to measure the spectrum of the light source IL that illuminates the color chart 1000. The illumination spectrum measuring device 2300 may be a known spectroradiometer. For the light source IL, a light source that can create similar environmental conditions to those of the scene to be reproduced is chosen. The reflectance of each color patch may be measured only once, for example, and the reflectances of the color patches and the spectrum of the light source IL may be input to a reference color signal value extraction device 2100. The reference color signal value extraction device 2100 may be a device including a processor, such as a computer. In the reference color signal value extraction device 2100, an integral is performed using a prepared color matching function, the reflectances of the color patches, and the spectrum of the light source IL. That is, the integral over the visible light range is determined with the product of the spectrum of the light source IL, the reflectances of the color patches, and the color matching function being the integrand. Computing reference color signal values through such a calculation can save the step of measuring the colors of the color patches for each of different environmental conditions.

<Variation 2>

In the configuration illustrated in FIG. 3, the image capture device 200 and color correction parameter computation system 10000 are separate devices. As will be described with reference to FIG. 6, however, the image capture device may include the function of computing color correction parameters.

Figure 6:
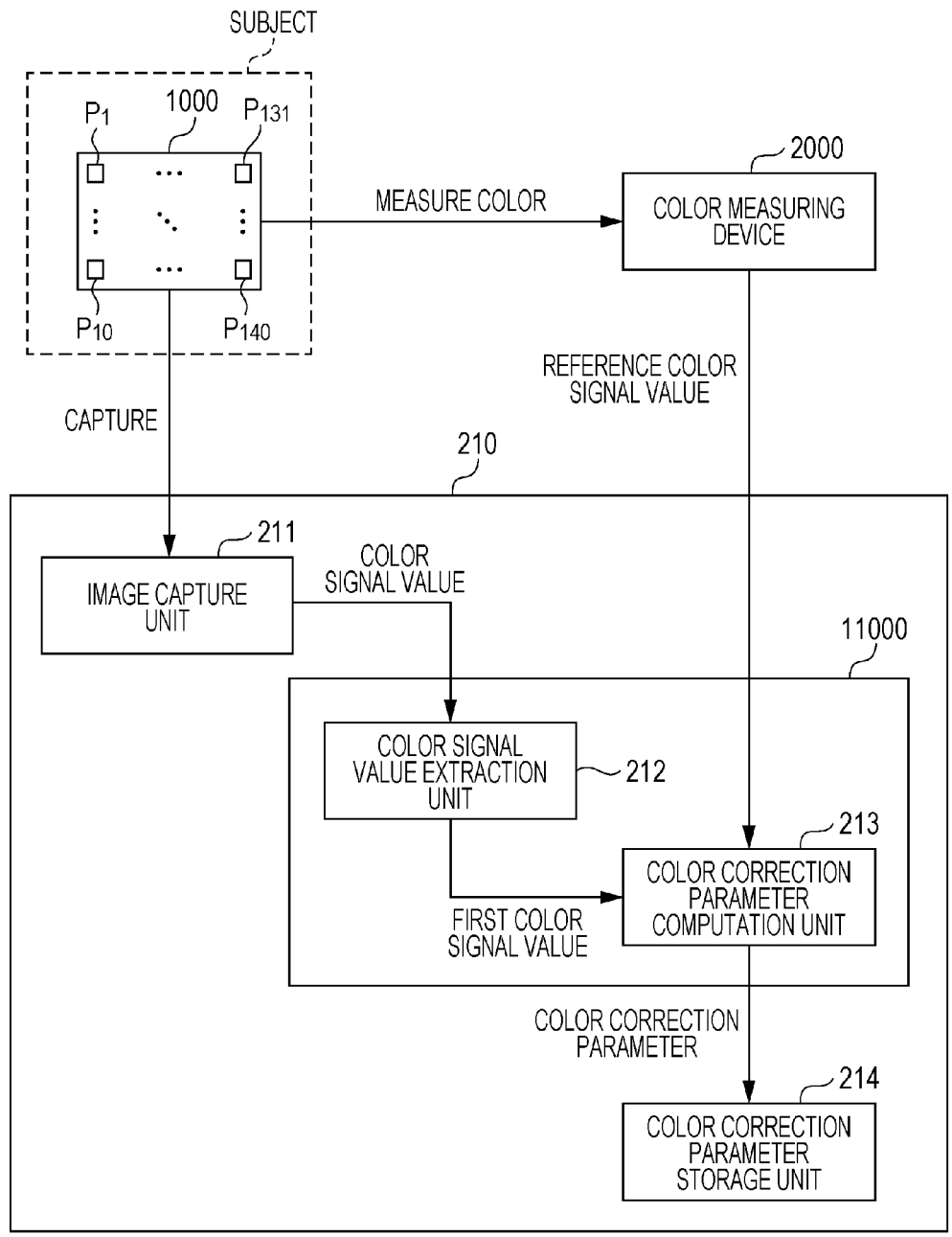
FIG. 6 schematically illustrates an exemplary configuration of an image capture device having a color correction parameter computing function.

FIG. 6 shows an exemplary configuration of an image capture device having the color correction parameter computing function. An image capture device 210 shown in FIG. 6 includes an image capture unit 211 with an image sensor, a color correction parameter computation system 11000, and a color correction parameter storage unit 214. In the illustrated example, the color correction parameter computation system 11000 includes a color signal value extraction unit 212 and a color correction parameter computation unit 213.

The color signal value extraction unit 212 is implemented as a processor, for example, and performs similar processing to the color signal value extraction device 300. The color correction parameter computation unit 213 is implemented as a processor, for example, and performs similar processing to the color correction parameter computation device 400. The color correction parameter computation unit 213 computes color correction parameters using first color signal values from the color signal value extraction unit 212 and reference color signal values from, for example, the color measuring device 2000. The color correction parameters computed are stored in the color correction parameter storage unit 214. The color correction parameter storage unit 214 may be memory, for example, and functions similarly to the color correction parameter storage device 500.

Figure 7:
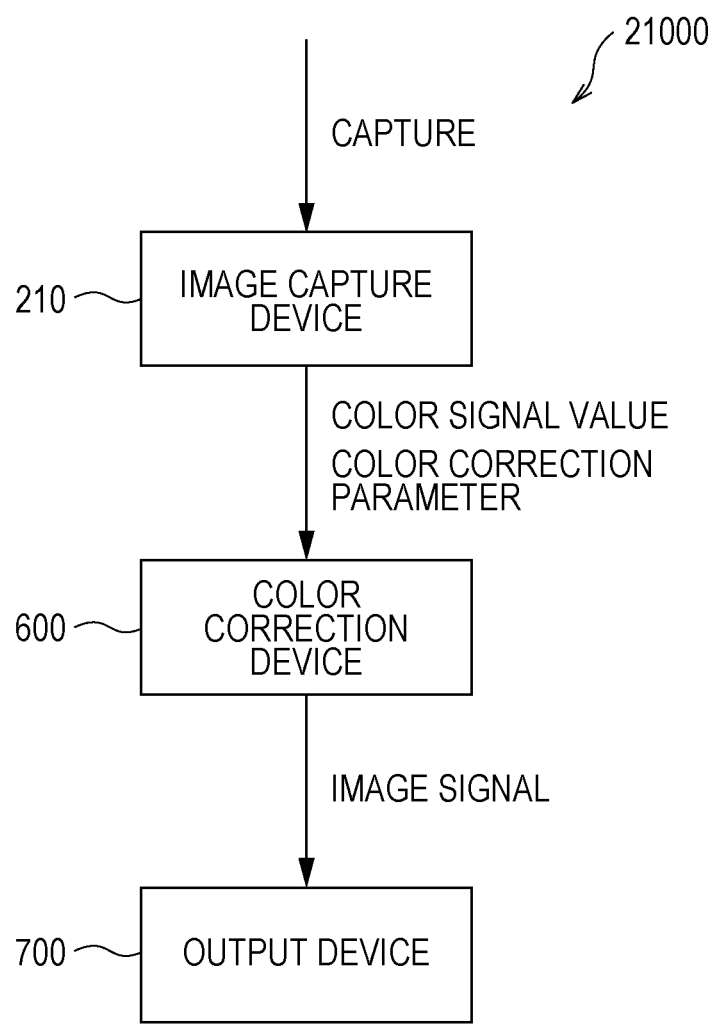
FIG. 7 is a block diagram generally illustrating an image output system including the image capture device shown in FIG. 6.

FIG. 7 generally illustrates an image output system 21000 including the image capture device 210. In the illustrated configuration, color signal values (for example, image signals) and color correction parameters are input from the image capture device 210 to the color correction device 600. The color correction device 600 carries out a color correction process using the color correction parameters received from the image capture device 210. To the output device 700, color-corrected image signals are input.

As just described, color correction parameters may also be computed using the image capture device 210. In such an implementation, by setting the color chart 1000 to be included in a captured image, color correction parameters suited for the environmental conditions at the time of photographing can be computed. Thus, color correction using color correction parameters suited for the environmental conditions at the time of photographing is facilitated.

<Variation 3>

In the configuration illustrated in FIG. 1, the color correction device 600 is a separate device from the color correction parameter computation system 10000 shown for example in FIG. 3. However, as will be described with reference to FIG. 8, the color correction device and the color correction parameter computation system may be integrated.

Figure 8:
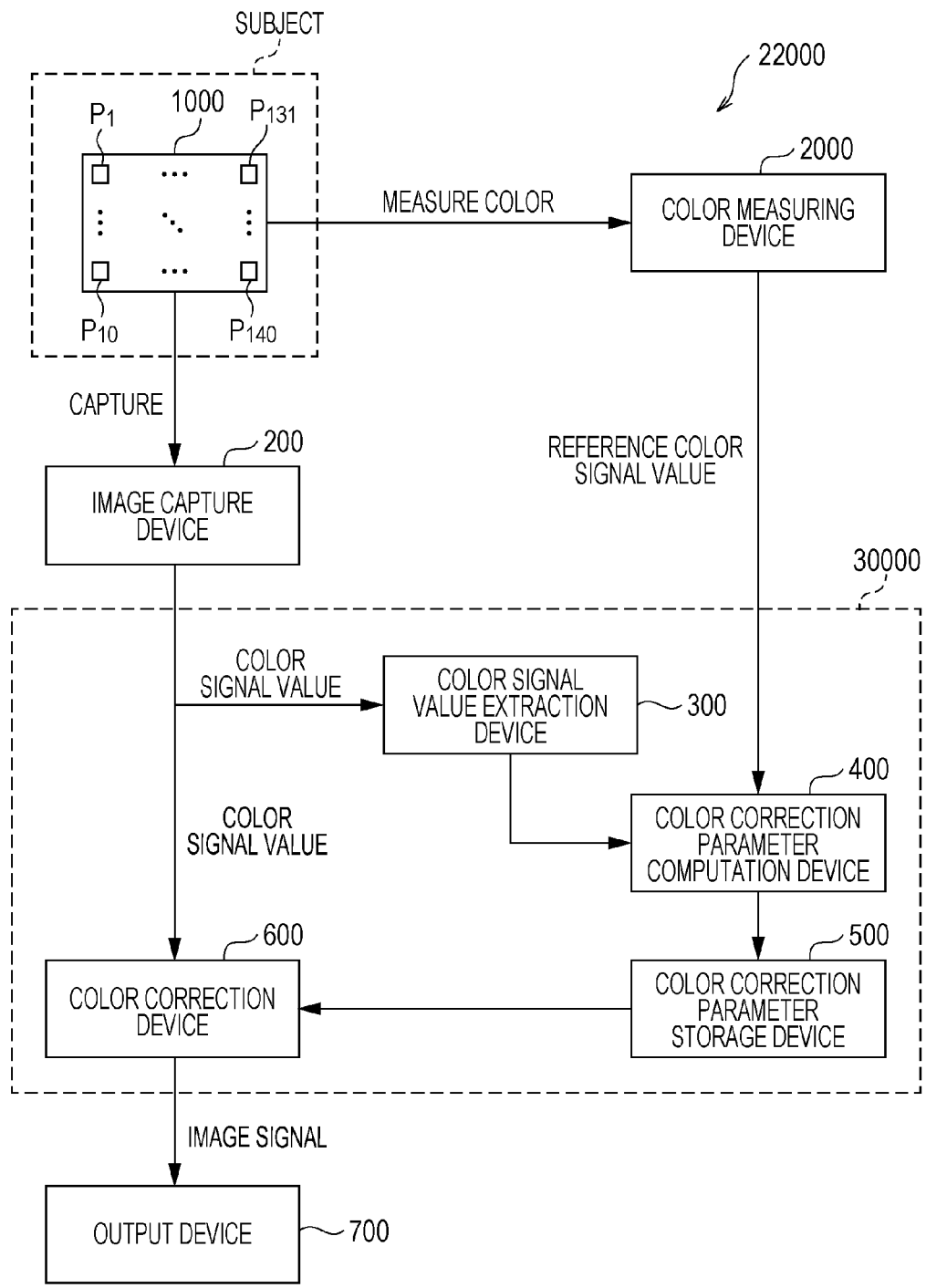
FIG. 8 is a block diagram showing an exemplary configuration of a color correction system in which a color correction device and a color correction parameter computation system are integrated.

FIG. 8 shows an exemplary configuration of a color correction system 30000 in which a color correction device and a color correction parameter computation system are integrated. The color correction system 30000 may be a single device, for example, which carries out computation of color correction parameters and color correction using the color correction parameters. As illustrated, the color correction system 30000 includes a color signal value extraction device 300, a color correction parameter computation device 400, a color correction parameter storage device 500, and the color correction device 600.

In the image output system 22000 shown in FIG. 8, the color correction system 30000 computes color correction parameters using color signal values (for example, image signals) input from the image capture device 210 and reference color signal values input from, for example, color measuring device 2000. The color correction system 30000 further performs a color correction process using color correction parameters at the color correction device 600 and outputs color-corrected image signals to the output device 700. In this configuration, photographing of the color chart 1000 with the image capture device 200 and input of color signal values (for example, image signals) to the color signal value extraction device 300 from the image capture device 200 have to be carried out only once at the beginning for each of different environmental conditions at the time of photographing.

Also in this configuration, by setting the color chart 1000 be included in a captured image, color correction parameters suited for the environmental conditions at the time of photographing can be computed. Thus, color correction using color correction parameters suited for the environmental conditions at the time of photographing is facilitated.

<Variation 4>

Figure 9:
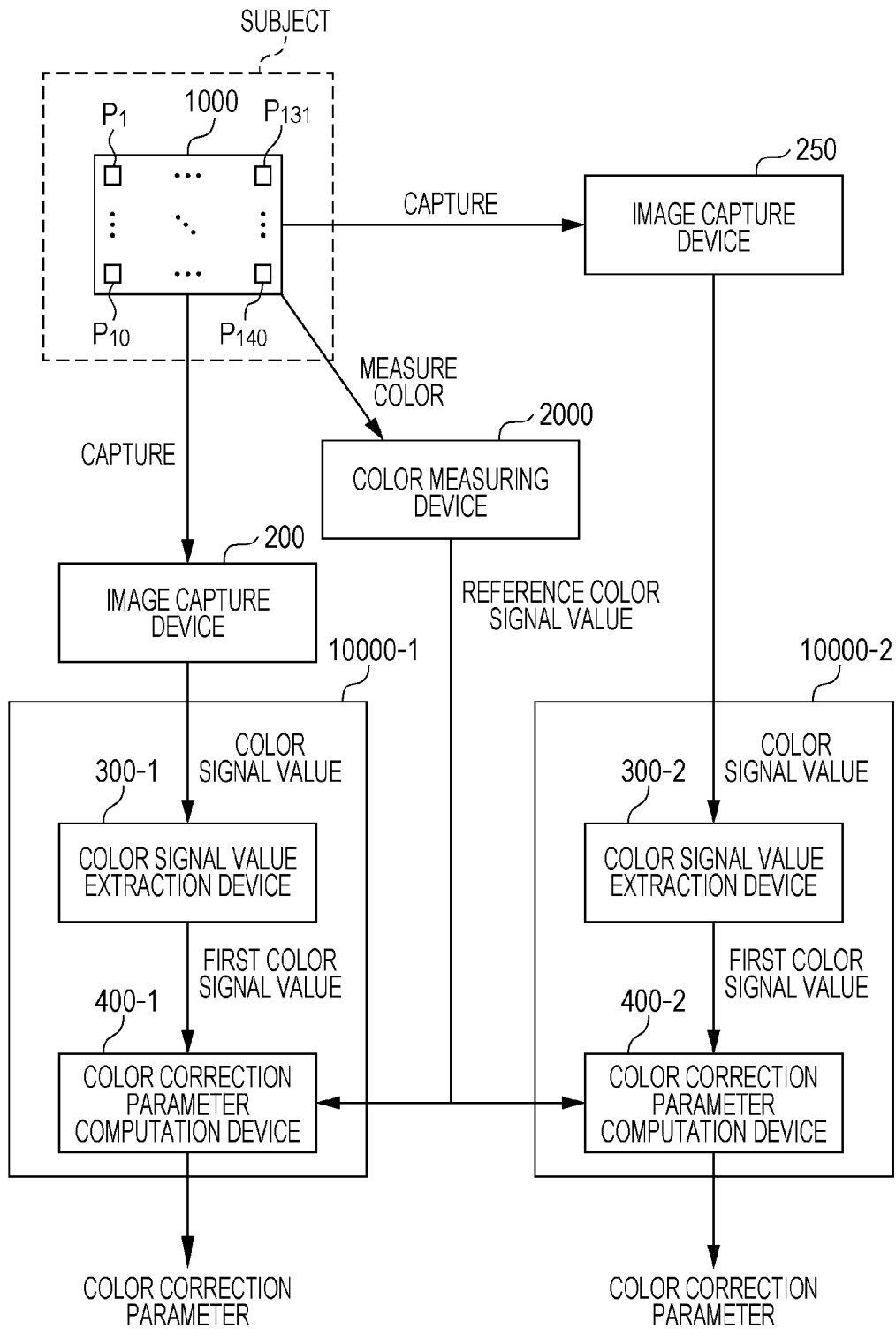
FIG. 9 is a block diagram showing an example of a configuration in which reference color signal values resulting from color measurement are shared by two image capture devices.

FIG. 9 shows an example of a configuration in which reference color signal values resulting from color measurement are shared by two image capture devices. In the configuration illustrated in FIG. 9, the color chart is photographed with both the image capture device 200 and an image capture device 250. The image capture device 250 is a device capable of capturing images of a subject as with the image capture device 200.

Image signals generated by photographing the color chart 1000 with the image capture device 200 are sent to a color signal value extraction device 300-1 of a color correction parameter computation system 10000-1. The color signal value extraction device 300-1 extracts the first color signal values corresponding to the colors of the color patches $P_1$ to $P_{140}$ from the image signals received from the image capture device 200. The first color signal values extracted by the color signal value extraction device 300-1 are input to a color correction parameter computation device 400-1. The color correction parameter computation device 400-1 acquires the first color signal values from the color signal value extraction device 300-1 and reference color signal values obtained with the color measuring device 2000. The color correction parameter computation device 400-1 uses them to compute color correction parameters for the image capture device 200.

In a similar manner, image signals generated by photographing the color chart 1000 with the image capture device 250 are sent to a color signal value extraction device 300-2 of a color correction parameter computation system 10000-2. The color signal value extraction device 300-2 extracts the first color signal values corresponding to the colors of the color patches $P_1$ to $P_{140}$ from the image signals received from the image capture device 250. The first color signal values extracted by the color signal value extraction device 300-2 are input to a color correction parameter computation device 400-2. The color correction parameter computation device 400-2 acquires the first color signal values from the color signal value extraction device 300-2 and reference color signal values obtained with the color measuring device 2000. The color correction parameter computation device 400-2 uses them to compute color correction parameters for the image capture device 250.

Computation of color correction parameters for the image capture device 200 at the color correction parameter computation device 400-1 and computation of color correction parameters for the image capture device 250 at the color correction parameter computation device 400-2 may be carried out either in sequence or in parallel.

Second Embodiment

The first embodiment uses sRGB signals for computation of color difference components and parameter $Q_k$ in computation of color correction parameters. However, the color signal values used for computation of color correction parameters may also be coordinate values in a color space instead of image signals such as sRGB signals. For instance, coordinate values in CIE 1931 XYZ color space, CIE-L*a*b* color space or the like may be employed. The second embodiment will illustrate a color correction parameter computation method that uses coordinate values in the CIE-L*a*b* color space. The CIE-L*a*b* color space is a uniform color space having good correlation between human color perception and distance in the color space. The CIE-L*a*b* color space is generally used for evaluating the degree of match of colors. The following description will omit discussion of matters that are in common with the first embodiment.

<Color Correction Parameter Computation Device>

Figure 10:
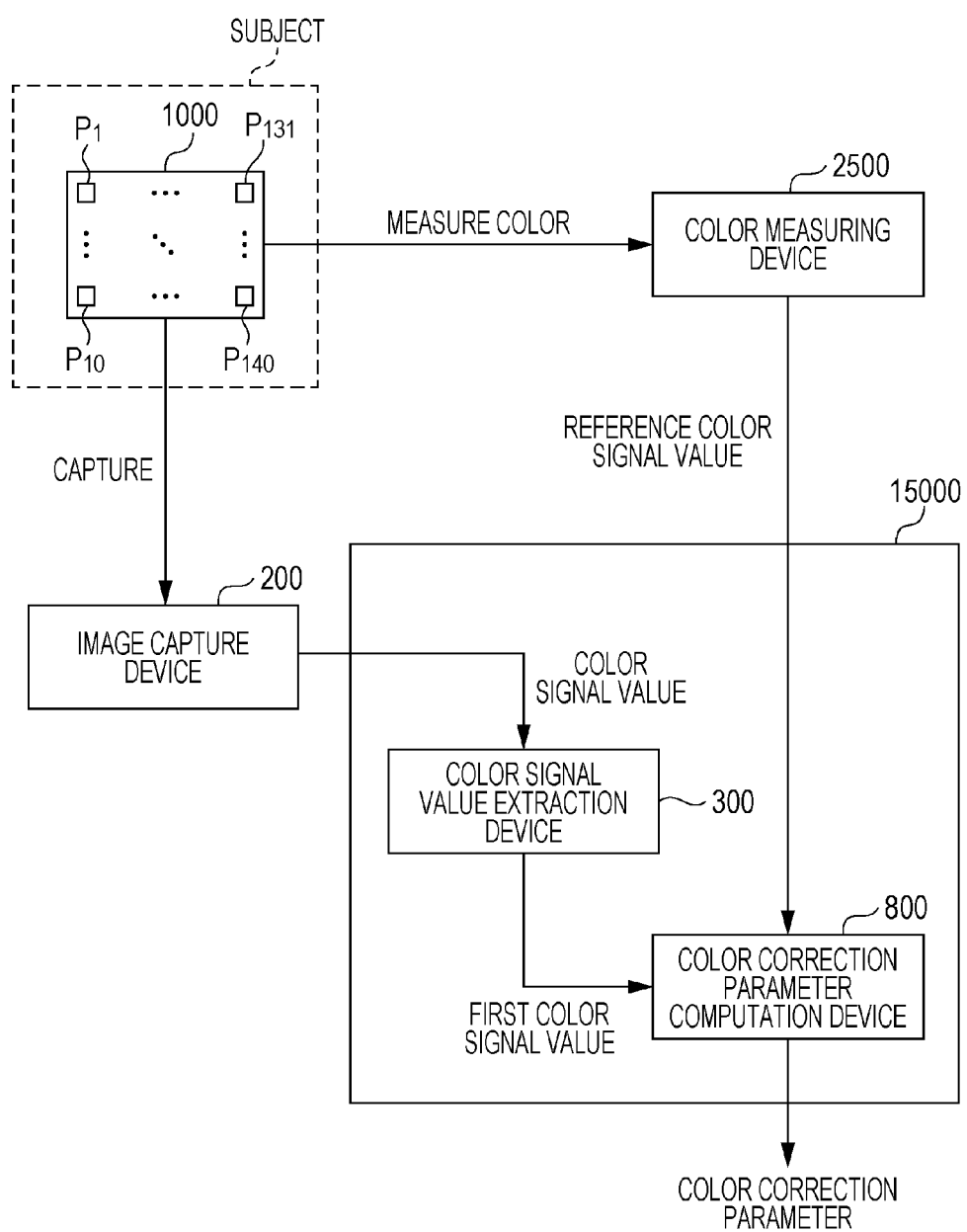
FIG. 10 is a block diagram illustrating an example of usage of a color correction parameter computation device according to a second embodiment of the present disclosure.

FIG. 10 is a block diagram illustrating an example of usage of a color correction parameter computation device 800 according to the second embodiment of the present disclosure. A color measuring device 2500 is a device, such as a colorimeter, capable of correctly measuring the coordinate values (L*,a*,b*) of a color patch in the CIE-L*a*b* color space. In this example, a CIE standard light source D65 is used as the illumination light source for measuring the colors of color patches and photographing of the color chart with the image capture device 200.

Color measurement using the color measuring device 2500, for example, yields reference color signal values $C'^{ref}_1$ to $C'^{ref}_{140}$, respectively defining the colors of the color patches. In this example, the reference color signal values $C'^{ref}_1$ to $C'^{ref}_{140}$ are coordinate values (L*,a*,b*) in the CIE-L*a*b* color space. The reference color signal values $C'^{ref}_1$ to $C'^{ref}_{140}$ obtained by color measurement using, for example, the color measuring device 2500 are input to the color correction parameter computation device 800. The color correction parameter computation device 800 thereby acquires the reference color signal values ($C'^{ref}_1$ to $C'^{ref}_{140}$). If the color values of the color patches are known, the known values of L*, a*, and b* may be input to the color correction parameter computation device 800. A color correction parameter computation system 15000 shown in FIG. 10 is constituted by the color signal value extraction device 300 and the color correction parameter computation device 800. The color correction parameter computation system 15000 may include additional devices.

<Color Correction Parameter Computation Method>

Figure 11:
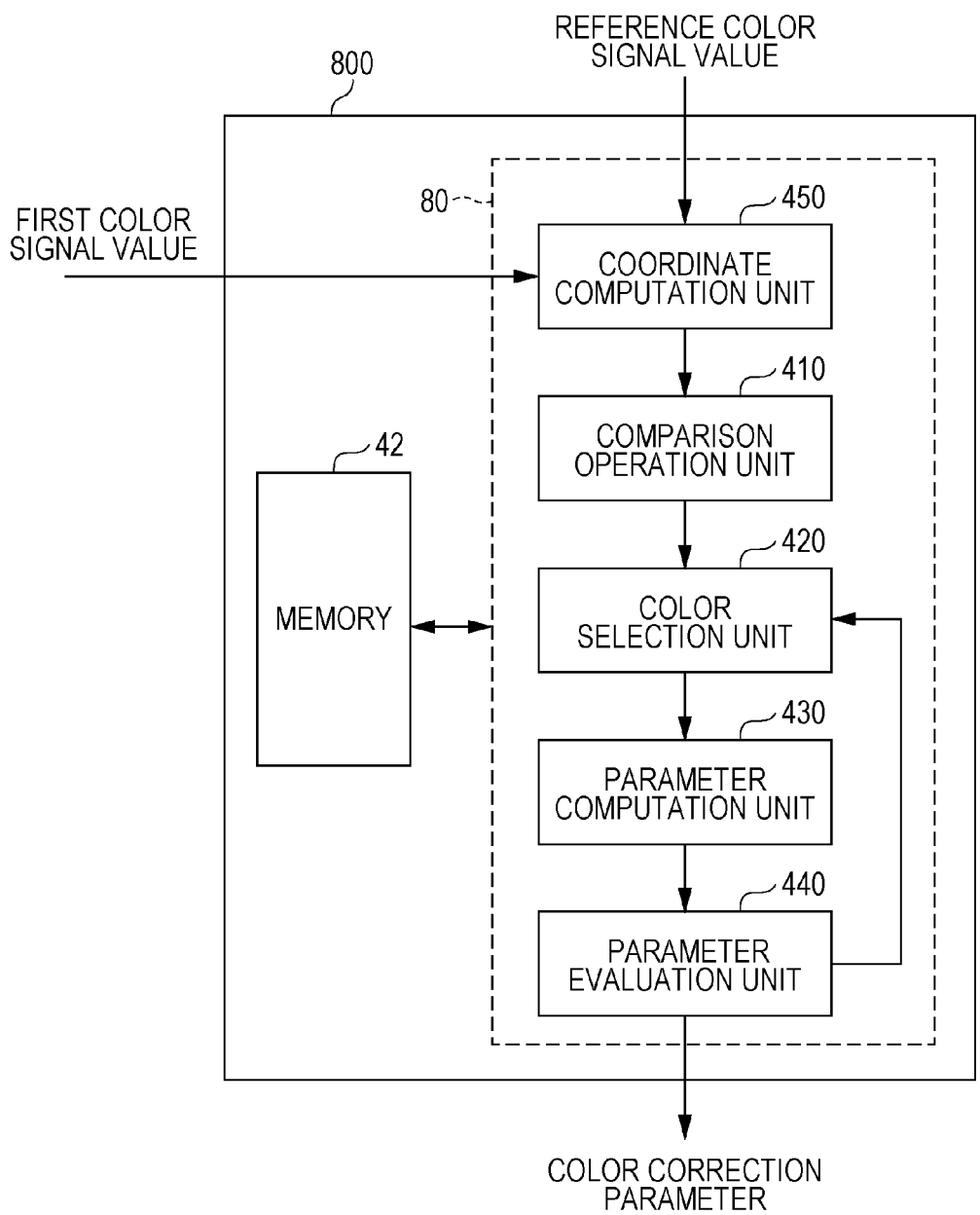
FIG. 11 is a block diagram generally illustrating the color correction parameter computation device according to the second embodiment of the present disclosure.

Referring to FIG. 11, the flow of processing in the color correction parameter computation device 800 will be described.

FIG. 11 generally illustrates the color correction parameter computation device 800 according to the second embodiment of the present disclosure. In the example shown in FIG. 11, the color correction parameter computation device 800 includes a processor 80 and the memory 42. In the configuration illustrated in FIG. 11, the processor 80 includes a coordinate computation unit 450, a comparison operation unit 410, a color selection unit 420, a parameter computation unit 430, and a parameter evaluation unit 440. The coordinate computation unit 450, comparison operation unit 410, color selection unit 420, parameter computation unit 430, and parameter evaluation unit 440 may be separate processors or two or more of them may be included in a single processor. The color correction parameter computation device 800 may be entirely or partially implemented as a DSP or an ASIC. The processor 80 may also include the memory 42 as a part thereof.

The coordinate computation unit 450 acquires the reference color signal values $C'^{ref}_1$ to $C'^{ref}_{140}$ and the first color signal values $C_1$ to $C_{140}$ output from, for example, the color signal value extraction device 300 (see FIG. 10). The reference color signal values $C'^{ref}_1$ to $C'^{ref}_{140}$ may be color signal values generated by color measurement using the color measuring device 2500. The first color signal values $C_1$ to $C_{140}$ may be sRGB signals, for example. The first color signal values $C_1$ to $C_{140}$ and the reference color signal values $C'^{ref}_1$ to $C'^{ref}_{140}$ have to be obtained only once at the start of the process of color correction parameter computation.

The coordinate computation unit 450 applies Equations (11) to (13) below to the first color signal values $C_1$ to $C_{140}$ to convert the sRGB signals to coordinate values (L*,a*,b*) in the CIE-L*a*b* color space. In the following descriptions, converted first color signal values will be represented as $C'^{ref}_1$ to $C'^{ref}_{140}$. When the first color signal values input to the color correction parameter computation device 800 are coordinate values in the CIE-L*a*b* color space, conversion of the color signal values may be omitted. Reference color signal values input to the coordinate computation unit 450 may also be sRGB signals. In that case, the coordinate computation unit 450 also converts the reference color signal values to coordinate values in the CIE-L*a*b* color space.

$$\begin{bmatrix} X \\ Y \\ Z \end{bmatrix} = \begin{bmatrix} 0.4124 & 0.3576 & 0.1805 \\ 0.2126 & 0.7152 & 0.0722 \\ 0.0193 & 0.1192 & 0.9505 \end{bmatrix} \begin{bmatrix} R \\ G \\ B \end{bmatrix} \quad (11)$$

$$L^* = 116 \cdot f(Y) - 16 \quad (12)$$
$$a^* = 500 \cdot \{f(X) - f(Y)\}$$
$$b^* = 200 \cdot \{f(X) - f(Z)\}$$

$$f(X) = \begin{cases} (X/95.047)^{\frac{1}{3}} & (X/95.047 \le 0.008856) \\ 7.787 \cdot (X/95.047) + 16/116 & (X/95.047 > 0.008856) \end{cases} \quad (13)$$

$$f(Y) = \begin{cases} (Y/100.00)^{\frac{1}{3}} & (Y/100.00 \le 0.008856) \\ 7.787 \cdot (Y/100.00) + 16/116 & (Y/100.00 > 0.008856) \end{cases}$$

$$f(Z) = \begin{cases} (Z/108.883)^{\frac{1}{3}} & (Z/108.883 \le 0.008856) \\ 7.787 \cdot (Z/108.883) + 16/116 & (Z/108.883 > 0.008856) \end{cases}$$

The coordinate computation unit 450 outputs the reference color signal values $C'^{ref}_1$ to $C'^{ref}_{140}$ and the first color signal values $C'_1$ to $C'_{140}$ to the comparison operation unit 410.

The comparison operation unit 410 applies Equation (14) to compute color difference components $\Delta E'_1$ to $\Delta E'_{140}$ between the first color signal values and the reference color signal values respectively for the color patch colors.

$$\Delta E'_i = \{(\Delta L^*_i)^2 + (\Delta a^*_i)^2 + (\Delta b^*_i)^2\}^{\frac{1}{2}} \quad (14)$$

In Equation (14), $\Delta L^*_i$, $\Delta a^*_i$, and $\Delta b^*_i$ are $\Delta L^*_i = L^{*ref}_i - L^*_i$, $\Delta a^*_i = a^{*ref}_i - a^*_i$, and $\Delta b^*_i = b^{*ref}_i - b^*_i$, respectively. Here, the reference color signal value $C'^{ref}_i$ and the first color signal value $C'_i$ corresponding to the i-th color patch are respectively represented as $(L^{*ref}_i, a^{*ref}_i, b^{*ref}_i)$ and $(L^*_i, a^*_i, b^*_i)$. The comparison operation unit 410 outputs the color difference component $\Delta E'_i$ and the data set $D_i$ to the color selection unit 420.

The color selection unit 420 compares the magnitude of the color difference component $\Delta E'_i$ it received as in the first embodiment. The color selection unit 420 then selects one or more of the colors of the color patches $P_i$ based on the result of the comparison of the magnitude of $\Delta E'_i$. For example, the color selection unit 420 finds the maximum color difference component $\Delta E'_{max}$ among $\Delta E'_1$ to $\Delta E'_{140}$ and adds the value of index i for the color patch corresponding to $\Delta E'_{max}$ and the data set $D'_i$ to the selected color list. The data set $D'_i$ is the pair of the reference color signal value $C'^{ref}_i$ and the first color signal value $C'_i$ that correspond to color patch $P_i$. As in the first embodiment, there will never be a case where all of the colors of color patches $P_i$ are selected in the step of selecting at least one color from the colors of the color patches $P_1$. The color selection unit 420 outputs the selected color list and the data sets $D'_1$ to $D'_{140}$ to the parameter computation unit 430.

The parameter computation unit 430 computes a color correction parameter using the first color signal value $C'_i$ that corresponds to a selected color among the colors of the color patches $P_i$ and the reference color signal value $C'^{ref}_i$ that defines the selected color. The second embodiment employs a similar color correction model to the first embodiment. Specifically, Equations (15), (16), (17), and (18) shown below which correspond to Equations (3), (4), (5), and (8) respectively are applied to compute parameter $Q'_k$. The specific flow of computing the parameter $Q'_k$ is substantially the same as in the first embodiment.

$$C'^{es}_i = \sum_{k=1}^{S} l(C'_i, T'_k) \cdot Q'_k + C'_i \quad (15)$$

$$l(C'_i, T'_k) = \begin{cases} 1 - \dfrac{e(C'_i, T'_k)}{10000} & (e(C'_i, T'_k) < 10000) \\ 0 & (e(C'_i, T'_k) \ge 10000) \end{cases} \quad (16)$$

$$e(C'_i, T'_k) = \{(L^*_i - L^*_k)^2 + (a^*_i - a^*_k)^2 + (b^*_i - b^*_k)^2\}^{\frac{1}{2}} \quad (17)$$

$$\begin{bmatrix} Q'_1 \\ \vdots \\ Q'_S \end{bmatrix} = \begin{bmatrix} l'_{1,1} & \cdots & l'_{1,S} \\ \vdots & \ddots & \vdots \\ l'_{S,1} & \cdots & l'_{S,S} \end{bmatrix}^{-1} \begin{bmatrix} P'_1 \\ \vdots \\ P'_S \end{bmatrix} \quad (18)$$

$T'_k$ in Equations (15) to (17) represents the first color signal value in the k-th data set included in the selected color list. In Equation (17), $T'_k$ is represented as $(L^*_k, a^*_k, b^*_k)$. In Equation (15), $C'^{es}_i$ represents the first corrected color signal value that is obtained by correcting the i-th first color signal value $C'_i$. The first corrected color signal value $C'^{es}_i$ is represented here as $(L^{*es}_i, a^{*es}_i, b^{*es}_i)$.

The amount of adjustment $P'_k$ in Equation (18) is defined as $P'_k = T'^{ref}_k - T'_k$. $T'^{ref}_k$ represents the reference color signal value in the k-th data set included in the selected color list. Here, the amount of adjustment $P'_k$ is represented as $(L^{*ref}_k - L^*_k, a^{*ref}_k - a^*_k, b^{*ref}_k - b^*_k)$. The amount of adjustment $P'_k$ is defined for the S data sets included in the selected color list. The denotation $I'_h, k$ in Equation (18) means $I(C'_h, T'_k)$.

The parameter $Q'_k$ obtained by application of Equation (18) is a parameter defined so that the color difference component between the reference color signal value $C'^{ref}_h$ that defines a color selected by the color selection unit 420 and the first corrected color signal value $C'^{es}_h$ is 0, as with the parameter $Q_k$ in the first embodiment. After computing the parameter $Q'_k$, the parameter computation unit 430 outputs the parameter $Q'_k$, the selected color list, and the data sets $D'_1$ to $D'_{140}$ to the parameter evaluation unit 440.

The parameter evaluation unit 440 determines the accuracy of correction. The parameter evaluation unit 440 computes a second corrected color signal value $C'^{es}_j$ by applying Equation (15) to the first color signal value $C'_j$ corresponding to a color that was not selected by the color selection unit 420 among the colors of the color patches.

The parameter evaluation unit 440 then uses Equation (19) below to compute the measure of accuracy $\Delta E'^A$.

$$\Delta E'^A = \dfrac{\sum_{j=1}^{N} \Delta E'^e_j}{N} \quad (19)$$

In Equation (19), $\Delta E'_j$ is the color difference component between the second corrected color signal value $C'^{es}_j$ and the reference color signal value $C'^{ref}_j$ defining a color that was not selected by the color selection unit 420. This color difference component $\Delta E'^{es}_j$ is represented by Equation (20) below:

$$\Delta E_j^{\prime e} = \{(\Delta L_j^{*e})^2 + (\Delta a_j^{*e})^2 + (\Delta b_j^{*e})^2\}^{\frac{1}{2}} \qquad (20)$$

In Equation (20), $\Delta L^{*e}_j = L^{*ref}_j - L^{*es}_j$, $\Delta a^{*e}_j = a^{*ref}_j - a^{*es}_j$, and $\Delta b^{*e}_j = b^{*ref}_j - b^{*es}_j$. The measure of accuracy $\Delta E'^A$ is the average color difference component between the corrected color signal values and the reference color signal values for the data sets that are not included in the selected color list. Here, the summation in Equation (19) is determined for the total number of data sets that are not included in the selected color list, as with Equation (9).

The parameter evaluation unit 440 then compares the value of the color difference component $\Delta E'^A$ with the value of a predetermined accuracy criterion $\epsilon'$ to determine the accuracy of correction. As noted above, the CIE-L*a*b* color space is a uniform color space having good correlation between human color perception and distance in the color space. The value of the measure of accuracy $\Delta E'^A$ therefore is correlated with the degree of difference between colors perceived by a human being. Thus, the second embodiment, which determines color correction parameters by means of coordinate values in the CIE-L*a*b* color space, has the advantage of facilitating setting the value of the accuracy criterion $\epsilon'$.

The value of the accuracy criterion $\epsilon'$ is stored in the memory 42, for example. For the value of the accuracy criterion $\epsilon'$, $\Delta E^*$ of 2.3, known as the color difference representing the limit at which the human eyes can recognize two colors as different colors, may be adopted, for example, i.e., $\epsilon'=2.3$. The value of the accuracy criterion $\epsilon'$ may be set to any value suited for the purpose.

If $\Delta E'^A \leq \epsilon$ is satisfied, the accuracy of correction can be determined to be sufficient. The parameter evaluation unit 440 accordingly outputs the parameter $Q'_k$ already determined. That is, the color correction parameter computation device 800 ends calculation and outputs the parameter $Q'_k$ as the color correction parameter. The color correction parameter is stored in the color correction parameter storage device 500 shown in FIG. 1, for example. The color correction parameter may be stored in the memory 42 instead.

When $\Delta E'^A > \epsilon'$, however, the accuracy of correction can be determined not to be sufficient. The parameter evaluation unit 440 then outputs color difference component $\Delta E'^e_j$ which is determined for each one of colors that were not selected by the color selection unit 420 among the colors of the color patches, the selected color list, and the data sets $D'_1$ to $D'_{140}$ to the color selection unit 420 as in the first embodiment.

The color selection unit 420 compares the magnitude of the color difference component $\Delta E'^e_j$. Here, the color selection unit 420 compares the magnitude of the color difference component $\Delta E'^e_j$ corresponding to each data set $D'_j$ that is not included in the selected color list with each other. Based on the comparison of the magnitude of color difference component $\Delta E'^e_j$, the color selection unit 420 further selects a color from the colors of the color patches except the ones already selected by the color selection unit 420. For example, the color selection unit 420 further adds the value of index i for the color patch that corresponds to the maximum $\Delta E'^e_{max}$ of the color difference component $\Delta E'^e_j$ and the data set $D'_i$ corresponding to that value of i to the selected color list. The color selection unit 420 outputs the updated selected color list and the data sets $D'_1$ to $D'_{140}$ to the parameter computation unit 430.

After this, processing by the parameter computation unit 430 and processing by the parameter evaluation unit 440 are executed again. That is, the processing in the color selection unit 420, the parameter computation unit 430, and the parameter evaluation unit 440 is repeated until $\Delta E'^A \leq \epsilon$ is satisfied.

Figure 12:
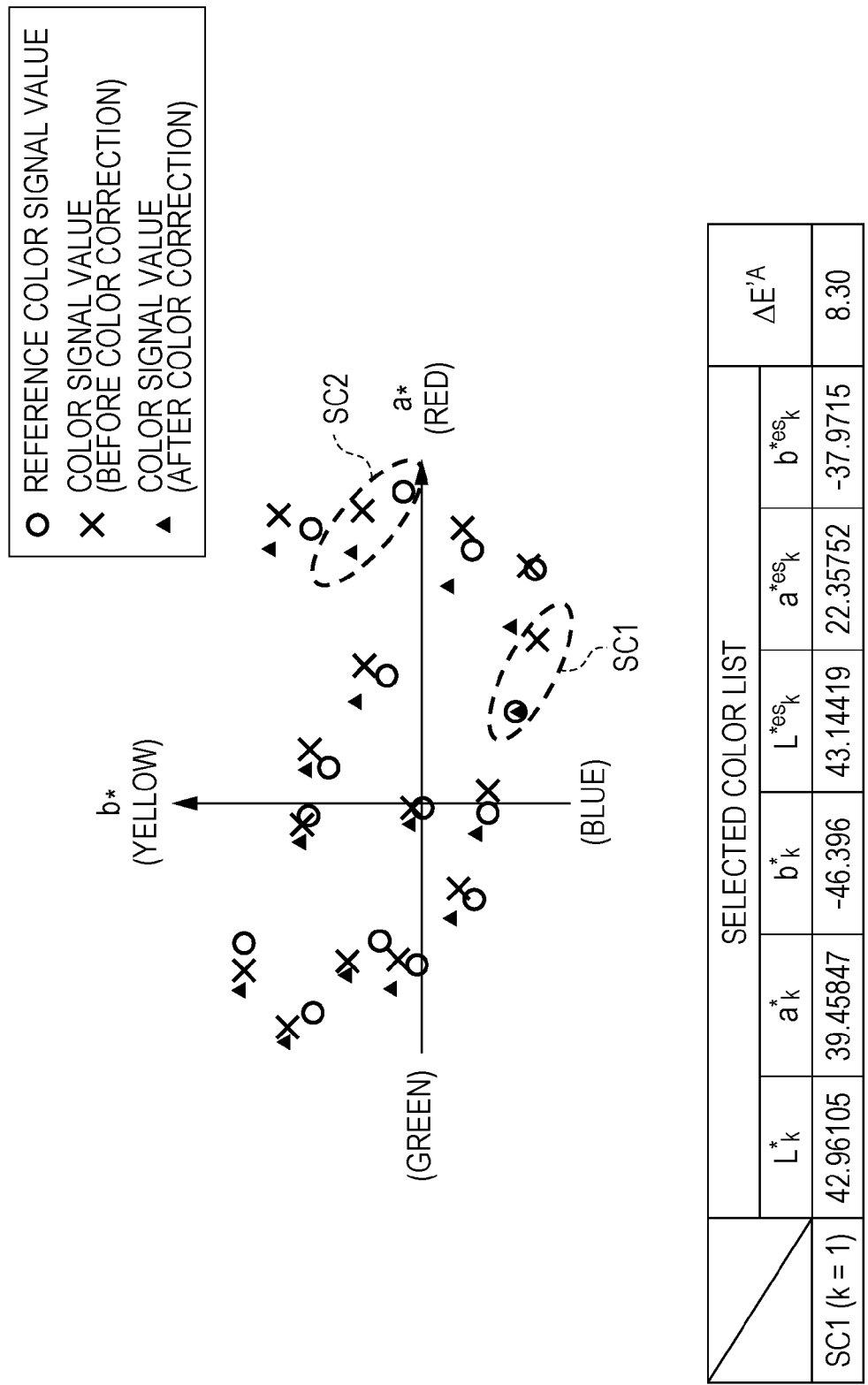
FIG. 12 is a diagram plotting reference color signal values and color signal values before and after color correction using a rectangular coordinate system with the horizontal axis and the vertical axis representing a* axis and b* axis respectively.
Figure 13:
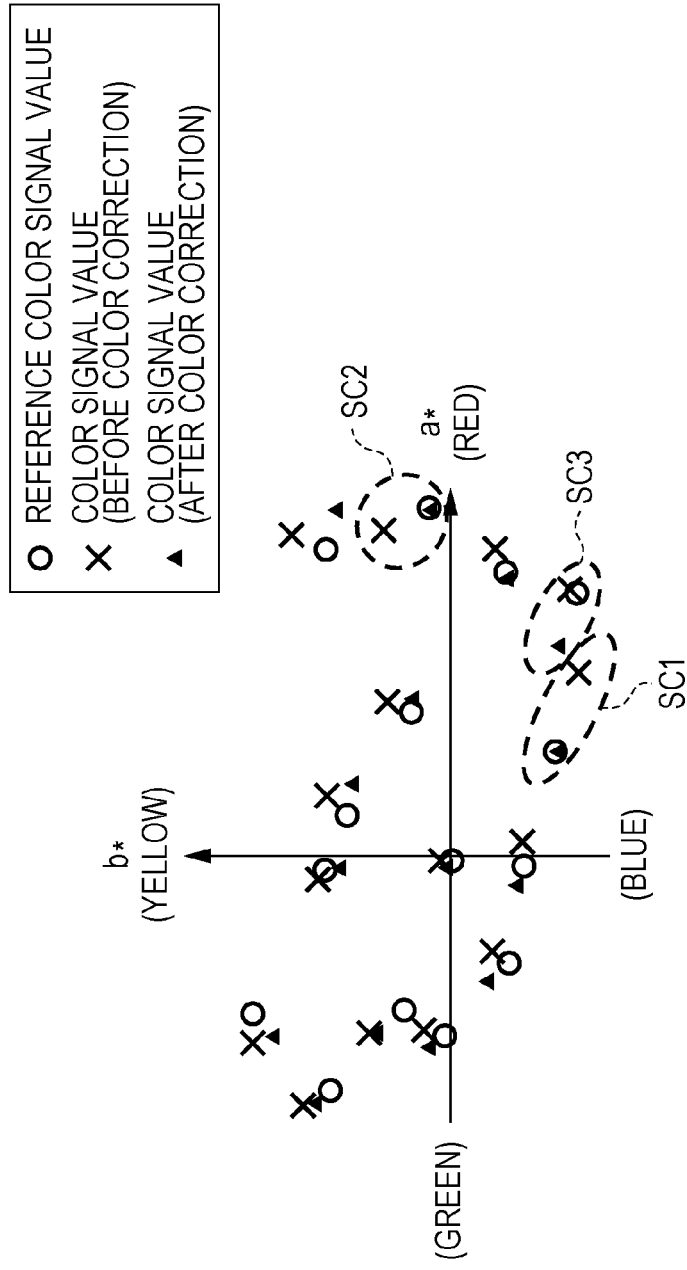
FIG. 13 is a diagram plotting reference color signal values and color signal values before and after color correction using a rectangular coordinate system with the horizontal axis and the vertical axis representing a* axis and b* axis respectively.
Figure 14:
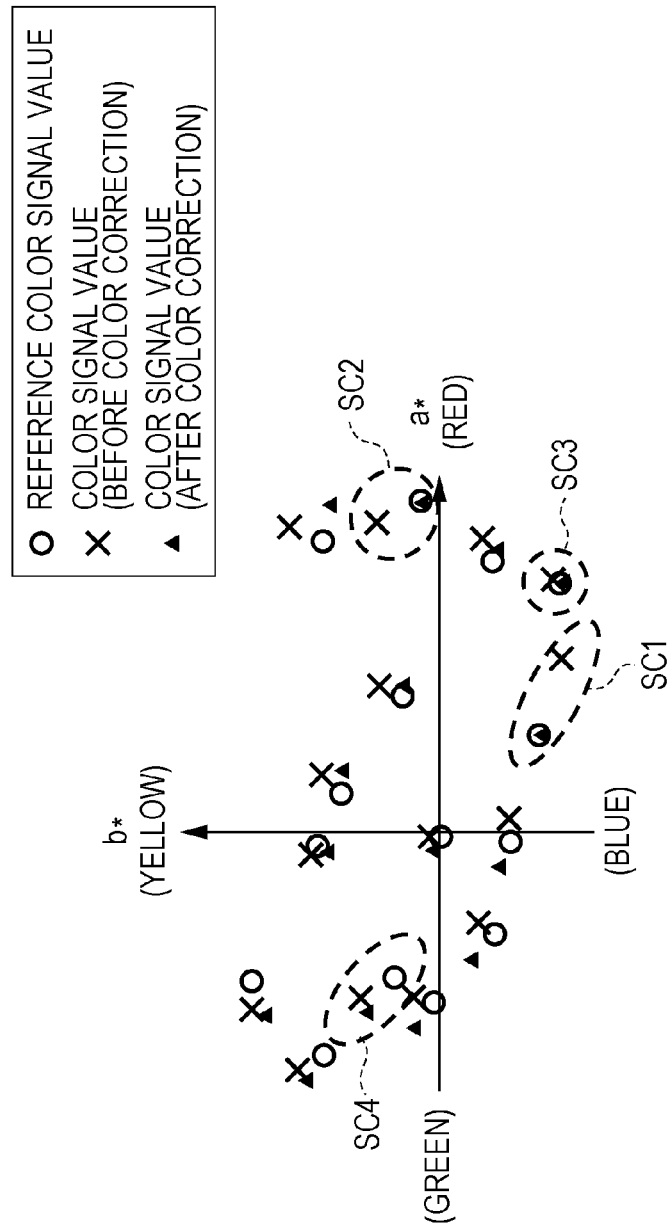
FIG. 14 is a diagram plotting reference color signal values and color signal values before and after color correction using a rectangular coordinate system with the horizontal axis and the vertical axis representing a* axis and b* axis respectively.

Referring now to FIGS. 12 to 14, a specific example of calculation will be described.

FIGS. 12 to 14 are diagrams plotting reference color signal values and color signal values before and after color correction using a rectangular coordinate system with the horizontal axis and the vertical axis representing a* axis and b* axis respectively. In FIGS. 12 to 14, "○", "x", and "▲" represent reference color signal values ($c'^{ref}_i$ and $c'^{ref}_j$), color signal values before color correction ($C_i$ and $C_j$), and color signal values after color correction ($C^{es}_i$ and $C^{es}_j$), respectively. FIG. 12 to FIG. 14 show color signal values only for some of the colors of the color patches present on the color chart. In order to avoiding complexity, difference in the magnitude of L* of each color signal value is neglected herein.

FIG. 12 shows color signal values for a case in which one of the colors of the color patches is selected (S=1, N=139). In FIG. 12, SC1 indicates signal values corresponding to the selected color. As illustrated, for the color corresponding to SC1, the first corrected color signal value resulting from correction using the parameter $Q'_k$ determined under this condition agrees with the reference corrected color signal value. The value of the measure of accuracy $\Delta E'^A$ in this case is 8.30 as shown in the table in FIG. 12. If this value of the measure of accuracy $\Delta E'^A$ is greater than the accuracy criterion $\epsilon'$, another color is newly selected from colors except the color corresponding to SC1.

By way of example, in a case in which colors are selected in descending order of the magnitude of the color difference component $\Delta E'^e_j$ between the second corrected color signal value $C'^{es}_j$ and a reference color signal value $C'^{ref}_j$ defining a color that was not selected by the color selection unit 420, the next color to be selected is the color corresponding to SC2 shown in FIG. 12. That is to say, the color with the greatest distance between ▲ and ○ on a*b* plane is added to the selected color list. The parameter $Q'_k$ is then recalculated.

FIG. 13 shows color signal values for a case in which the color corresponding to SC1 and the color corresponding to SC2 have been selected (S=2). As illustrated, for SC1 and SC2, the first corrected color signal value agrees with the reference corrected color signal value after correction using the recalculated parameter $Q'_k$. The distance between ▲ and ○ are also reduced for most of the other colors compared with the case shown in FIG. 12. In other words, difference from the colors perceived in the real scene can be reduced also for colors other than the already selected colors. The value of the measure of accuracy $\Delta E'^A$ in this case is 3.48 as indicated in the table in FIG. 13, smaller than 8.30, which means that parameters that can approximate various colors included in the scene to be reproduced to ideal colors more extensively have been obtained than when only one color is added to the selected color list.

If the value of the measure of accuracy $\Delta E'^A$ at this point is greater than the accuracy criterion $\epsilon'$, another color is newly selected from colors except the color corresponding to SC1 and the color corresponding to SC2. In FIG. 13, color signal values corresponding to the next color to be selected are indicated as SC3.

FIG. 14 shows color signal values for a case in which the color corresponding to SC1, the color corresponding to SC2, and the color corresponding to SC3 have been selected (S=3). The value of the measure of accuracy $\Delta E'^A$ in this case is 3.26 as indicated in the table in FIG. 14, smaller than 3.48 obtained in the preceding calculation. This implies that parameter $Q'_k$ having higher color correction effects than when two colors are added to the selected color list has been obtained. If the value of the measure of accuracy $\Delta E'^A$ at this point is equal to or smaller than the accuracy criterion $\epsilon'$, the current parameter $Q'_k$ is output as the color correction parameter. If the value of the measure of accuracy $\Delta E'^A$ at this point is greater than the accuracy criterion $\epsilon'$, another color is newly selected and the parameter $Q'_k$ is recalculated. In FIG. 14, color signal values corresponding to the next color to be selected are indicated as SC4. Study by the present inventor has found that when the aforementioned $\Delta E^*=2.3$ is adopted as the value of the accuracy criterion $\epsilon'$, about 20 colors are selected by the color selection unit 420.

Color correction parameter computed as described above can be utilized in the image output system 20000 described with reference to FIG. 1, for example. The color correction device 600 reads the parameter $Q'_k$ from the color correction parameter storage device 500. The color correction device 600 applies Equations (11) to (13) to the image signals (sRGB signals in the current example) input from the image capture device 200 to convert the sRGB signals into coordinate values in the CIE-L*a*b* color space. This conversion is omitted if image information input from the image capture device 200 is in the form of coordinate values in the CIE-L*a*b* color space. The color correction device 600 reads the parameter $Q'_k$ from the color correction parameter storage device 500 and applies Equation (15) to the coordinate values resulting from the conversion to carry out color correction. The color correction device 600 thereby computes color-corrected color signal values and outputs them to the output device 700.

If the output device 700 supports the color gamut defined by the sRGB standard, the color-corrected coordinate values are converted to sRGB signals as necessary. Specifically, by applying Equations (21) to Equation (23) in sequence, the coordinate values in the CIE-L*a*b* color space are converted to sRGB signals.

$$f_Y = (L^* + 16)/116 \quad (21)$$
$$f_X = f_Y + a^*/500$$
$$f_Z = f_Y - b^*/200$$

$$X = \begin{cases} 95.047 \cdot f_X^3 & (f_X > 0.20690) \\ 95.047 \cdot (f_X - 16/116)/7.787 & (f_X \le 0.20690) \end{cases} \quad (22)$$

$$Y = \begin{cases} 100.00 \cdot f_Y^3 & (f_Y > 0.20690) \\ 100.00 \cdot (f_Y - 16/116)/7.787 & (f_Y \le 0.20690) \end{cases}$$

$$Z = \begin{cases} 108.883 \cdot f_Z^3 & (f_Z > 0.20690) \\ 108.883 \cdot (f_Z - 16/116)/7.787 & (f_Z \le 0.20690) \end{cases}$$

$$\begin{bmatrix} R \\ G \\ B \end{bmatrix} = \begin{bmatrix} 3.2410 & -1.5374 & -0.4986 \\ -0.9692 & 1.8760 & 0.0416 \\ 0.0556 & -0.2040 & 1.0570 \end{bmatrix} \begin{bmatrix} X \\ Y \\ Z \end{bmatrix} \quad (23)$$

As described above, the color correction parameter computation method according to the present disclosure is not limited to a computation method that employs image signals but can be a computation method that employs coordinate values in a color space. Conversion and/or inverse conversion between sRGB signals and coordinate values in the CIE-L*a*b* color space may be done by the color correction device 600 or other device in the image output system 20000.

Third Embodiment

Color signal values generated by photographing the color chart 1000 with an image capture device instead of the color measuring device 2000 may be used as reference color signal values. By doing so, color correction parameters can be computed that approximate colors in an image of the subject captured by image capture device A to colors that would look when captured by another image capture device B which is used for generation of reference color signal values. That is, even though the image was captured with image capture device A, colors that look as if captured by image capture device B can be reproduced on a display.

<Overview of the Color Correction Parameter Computation System>

Figure 15:
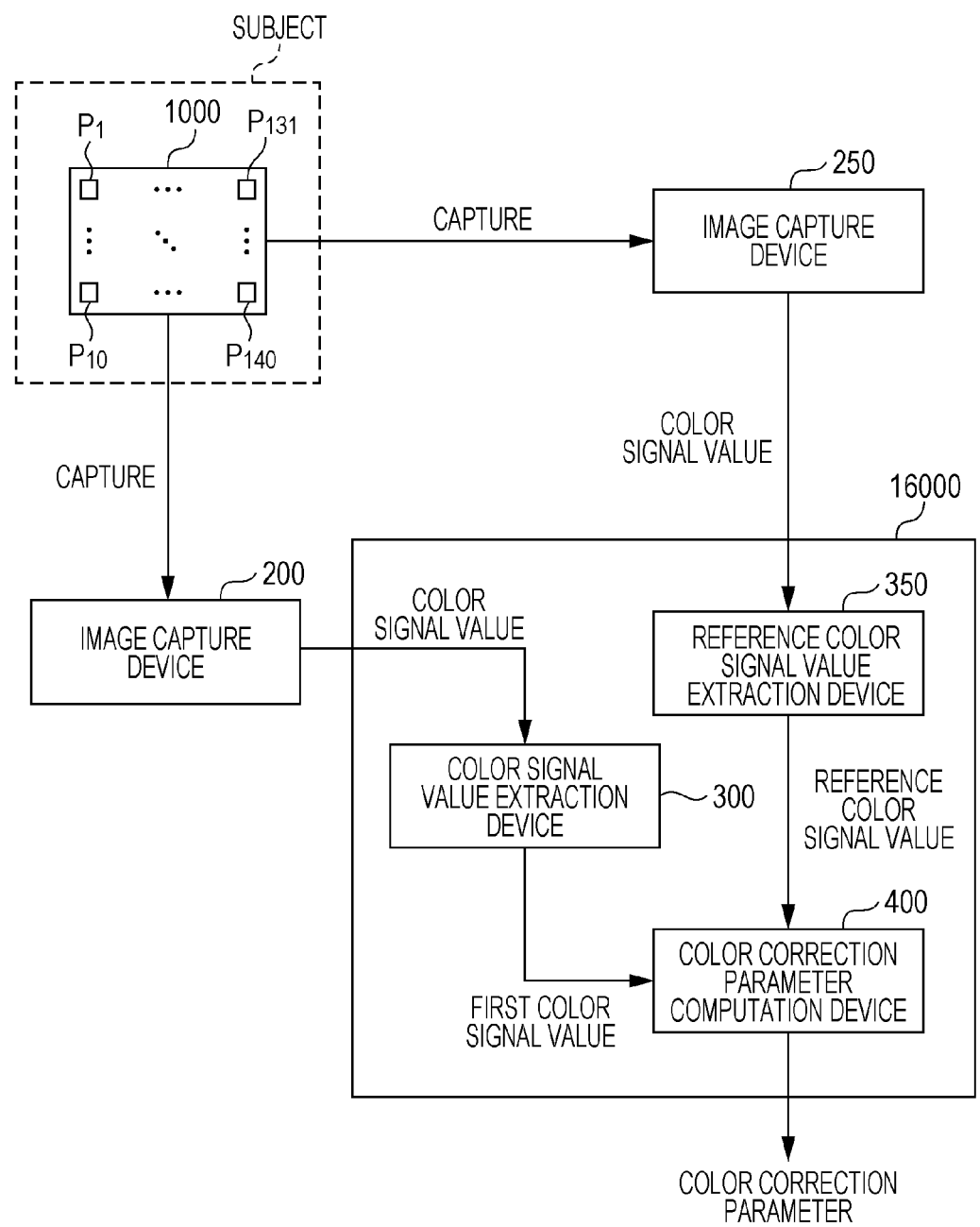
FIG. 15 is a block diagram illustrating another example of usage of the color correction parameter computation device.

FIG. 15 is a block diagram illustrating another example of usage of the color correction parameter computation device 400. The difference from the usage of the color correction parameter computation device 400 described in the first embodiment (see FIG. 3) is that, in place of the color measuring device 2000, the color chart 1000 is photographed with an image capture device 250 different from the image capture device 200 which obtains color signal values used for generating first color signal values.

The image signals generated by photographing the color chart 1000 with the image capture device 250 are sent to a color correction parameter computation system 16000. As shown in FIG. 15, the color correction parameter computation system 16000 includes the color signal value extraction device 300, the reference color signal value extraction device 350, and the color correction parameter computation device 400, for example. The reference color signal value extraction device 350 extracts color signal values corresponding to the colors of the color patches $P_1$ to $P_{140}$ from the image signals received from the image capture device 250 as with the color signal value extraction device 300. Extraction of color signal values by the reference color signal value extraction device 350 is not limited to a particular method; color signal values may be extracted by applying similar processing to that performed in the color signal value extraction device 300, for example.

The reference color signal value extraction device 350 outputs the color signal values corresponding to the colors of the color patches $P_1$ to $P_{140}$ to the color correction parameter computation device 400 as reference color signal values ($C^{ref}_1$ to $C^{ref}_{140}$). The color correction parameter computation device 400 receives the reference color signal values ($C^{ref}_1$ to $C^{ref}_{140}$) and the first color signal values ($C_1$ to $C_{140}$) from the reference color signal value extraction device 350 and the color signal value extraction device 300 respectively. The color correction parameter computation device 400 computes color correction parameters using the reference color signal values ($C^{ref}_1$ to $C^{ref}_{140}$) and the first color signal values ($C_1$ to $C_{140}$) it received. As described above, in the third embodiment, color correction parameters are computed by use of color signal values obtained by photographing the color chart 1000 with the image capture device 250 as reference color signal values.

The color correction parameters thus obtained are such color correction parameters that approximate the colors in an image of the subject captured by the image capture device 200 to colors that would look when captured by the image capture device 250. That is, by using color signal values obtained with a certain image capture device as the references, it is possible to compute color correction parameters that can reduce difference in colors associated with difference in model when images of the subject are reproduced using the same display, for example. It is also possible to compute color correction parameters that can reduce difference in reproduced colors associated with individual difference among image capture devices of the same model.

In the configuration described with FIG. 9, the color measuring device 2000 may be replaced with a further image capture device. Using an additional image capture device different from the image capture device 200 and the image capture device 250 to obtain reference color signal values, color correction parameters that can reduce difference in reproduced colors associated with individual difference and the like among three or more image capture devices could be computed.

As described above, according to the present disclosure, color correction parameters can be computed with a relatively low computational load. The color correction model is not limited to the model used in the first to third embodiments. For instance, a 3×3 color conversion matrix such as ones used in Japanese Unexamined Patent Application Publication No. 2005-45446 or 2010-124168, a matrix transformation model including higher order terms, a three-dimensional translation transformation model such as presented by Japanese Unexamined Patent Application Publication No. 2011-259047, a rigid transformation model, a similarity transformation model, an affine transformation model, a projective transformation mode, or the like may be utilized. For computation of color correction parameters, multi-constraint FNS or multi-constraint extended FNS, such as one presented in Kanatani Kenichi and Sugaya Yasuyuki: "Extended FNS for Constrained Parameter Estimation", IPSJ SIG Technical Report, 2007-CVIM-158-4, March 2007, pp. 27-29, may be employed.

In addition to computation of color correction parameters aimed at color correction, the color correction parameter computation method of the present disclosure is also applicable to computation of color correction parameters for conversion between different kinds of color space or color system (for example, conversion/inverse conversion between RGB color space and XYZ color space, conversion/inverse conversion between RGB color system and CMYK color system for printing), for example.

The image output system and color correction parameter computation device according to the present disclosure are not limited to the above-described embodiments but permits various modifications. For example, the color correction device may be incorporated into the image capture device. Alternatively, the output device may include the color correction device. For example, when the image capture device (or the output device) includes a color correction parameter storage unit, the image capture device (or the output device) may be connected with an external server so that color correction parameters saved on the server may be retrieved by the image capture device (or the output device). In such an implementation, establishing an ID identifying each image capture device allows color correction parameters suited for the image capture device that was used for photographing to be obtained.

As another example, first color signal values may be taken from image data stored in a memory card or the like and used to compute color correction parameters. The color correction device may be then configured to output image signals such as sRGB signals.

The embodiments described in the present disclosure may be combined to the extent that there is no inconsistency.

The present disclosure is useful for computing color correction parameters for use in color correction to image information resulting from photographing.

What is claimed is:

1. A color correction parameter computation method comprising:
    obtaining a plurality of first color signal values that respectively correspond to colors of a plurality of color patches and are obtained by photographing a color chart having the color patches on a surface, and a plurality of reference color signal values respectively defining the colors of the color patches;
    computing, for each one of the colors of the color patches, a color difference component between a corresponding one of the first color signal values and a corresponding one of the reference color signal values;
    selecting at least one color of the color patches based on comparison of magnitude of the obtained color difference components;
    computing a color correction parameter using the first color signal value corresponding to the selected color and the reference color signal value that defines the selected color, the color correction parameter being a parameter that makes the color difference component between a first corrected color signal value which is obtained by correcting the first color signal value corresponding to the selected color using the color correction parameter and the reference color signal value defining the selected color smaller than the color difference component between the first color signal value corresponding to the selected color and the reference color signal value defining the selected color;
    computing a measure of accuracy using the color difference component between a second corrected color signal value which is obtained by correcting a first color signal value corresponding to a color other than the selected color using the color correction parameter and the reference color signal value that defines the color other than the selected color; and
    determining accuracy of correction by comparing the measure of accuracy to a predetermined accuracy criterion.

2. The color correction parameter computation method according to claim 1,
    wherein if the accuracy is determined not to satisfy a predetermined accuracy in the determining the accuracy of correction, the method further comprising selecting a color other than the selected color based on comparison of magnitude of the color difference components between the second corrected color signal values and reference color signal values defining colors other than the selected color, and the computing a color correction parameter, the computing a measure of accuracy and the determining the accuracy of correction are executed again.

3. The color correction parameter computation method according to claim 2,
    wherein the selecting a color other than the selected color includes selecting colors in descending order of the magnitude of the color difference components between the second corrected color signal values and reference color signal values defining colors other than the selected color.

4. The color correction parameter computation method according to claim 1,
    wherein the obtaining a plurality of first color signal values includes obtaining the plurality of first color signal values by photographing the color chart.

5. The color correction parameter computation method according to claim 1, wherein the plurality of reference color signal values are signal values obtained by measuring the colors of the plurality of color patches.

6. The color correction parameter computation method according to claim 1,
wherein the selecting at least one color of the color patches includes selecting colors in descending order of the magnitude of the color difference components.

7. The color correction parameter computation method according to claim 1,
wherein the plurality of first color signal values and the plurality of reference color signal values are coordinate values in CIE 1976 L*a*b* color space.

8. The color correction parameter computation method according to claim 1,
wherein the color correction parameter computed in the computing the color correction parameter is a parameter defined so that the color difference component between the first corrected color signal value and the reference color signal value defining the selected color is 0.

9. The color correction parameter computation method according to claim 1,
wherein the computing the measure of accuracy includes
computing, for each one of colors other than the selected color, the color difference component between a corresponding one of the second corrected color signal values and a corresponding reference color signal value that defines the color other than the selected color, and
of computing an average value of the color difference components and setting the average value as the measure of accuracy.

10. The color correction parameter computation method according to claim 1,
wherein the computing the measure of accuracy includes
of computing, for each one of colors other than the selected color, the color difference component between a corresponding one of the second corrected color signal values and a corresponding reference color signal value that defines the color other than the selected color,
extracting a maximum value of the color difference components, and
setting the maximum value as the measure of accuracy.

11. The color correction parameter computation method according to claim 1,
wherein the computing the measure of accuracy includes
computing, for each one of colors other than the selected color, the color difference component between a corresponding one of the second corrected color signal values and a corresponding reference color signal value that defines the color other than the selected color,
computing an average value of the color difference components determined,
extracting a maximum value of the color difference components determined, and
setting a weighted sum of the average value and the maximum value as the measure of accuracy.

12. A color correction parameter computation device comprising:
one or more processors; and
a memory in which a program to be executed by the one or more processors is stored,
wherein the program includes instructions for executing a process including
obtaining a plurality of first color signal values that respectively correspond to colors of a plurality of color patches and are obtained by photographing a color chart having the color patches on a surface, and a plurality of reference color signal values respectively defining the colors of the color patches,
computing, for each one of the colors of the color patches, a color difference component between a corresponding one of the first color signal values and a corresponding one of the reference color signal values,
selecting at least one color of the color patches based on comparison of magnitude of the obtained color difference components,
computing a color correction parameter using the first color signal value corresponding to the selected color and the reference color signal value that defines the selected color, the color correction parameter being a parameter that makes the color difference component between a first corrected color signal value which is obtained by correcting the first color signal value corresponding to the selected color using the color correction parameter and the reference color signal value defining the selected color smaller than the color difference component between the first color signal value corresponding to the selected color and the reference color signal value defining the selected color,
computing a measure of accuracy using the color difference component between a second corrected color signal value which is obtained by correcting a first color signal value corresponding to a color other than the selected color using the color correction parameter and the reference color signal value that defines the color other than the selected color, and
determining accuracy of correction by comparing the measure of accuracy to a predetermined accuracy criterion.

13. The color correction parameter computation device according to claim 12,
wherein the program further includes instructions for
if the accuracy is determined not to satisfy a predetermined accuracy in the determining the accuracy of correction, further selecting a color other than the selected color based on comparison of magnitude of the color difference components between the second corrected color signal values and reference color signal values defining colors other than the selected color, and
after executing the selecting a color other than the selected color, executing the computing the color correction parameter, computing the measure of accuracy, and determining the accuracy of correction again.

14. The color correction parameter computation device according to claim 13,
wherein the selecting the at least one color of the color patches includes selecting colors in descending order of the magnitude of the color difference components between the second corrected color signal values and reference color signal values defining colors other than the selected color determined.

15. The color correction parameter computation device according to claim 12,
wherein the selecting the at least one color of the color patches includes storing in the memory a list of a pair of the first color signal value corresponding to the selected color and the reference color signal value defining the selected color based on comparison of the magnitude of the color difference components.

16. An image output system comprising:

an image capture device;

a color correction device that receives image information obtained by the image capture device and color correction parameters computed by a color correction parameter computation device and performs color correction to the image information; and an output device that displays or prints an output from the color correction device, wherein the color correction parameter computation device includes
- one or more processors, and
- a memory in which a program to be executed by the one or more processors is stored, wherein the program includes instructions for executing a process including obtaining a plurality of first color signal values that respectively correspond to colors of a plurality of color patches and are obtained by photographing a color chart having the color patches on a surface using the image capture device, and a plurality of reference color signal values respectively defining the colors of the color patches, computing, for each one of the colors of the color patches, a color difference component between a corresponding one of the first color signal values and a corresponding one of the reference color signal values, selecting at least one color of the color patches based on comparison of magnitude of the obtained color difference components, computing a color correction parameter using the first color signal value corresponding to the selected color and the reference color signal value that defines the selected color, the color correction parameter being a parameter that makes the color difference component between a first corrected color signal value which is obtained by correcting the first color signal value corresponding to the selected color using the color correction parameter and the reference color signal value defining the selected color smaller than the color difference component between the first color signal value corresponding to the selected color and the reference color signal value defining the selected color, computing a measure of accuracy using the color difference component between a second corrected color signal value which is obtained by correcting a first color signal value corresponding to a color other than the selected color using the color correction parameter and the reference color signal value that defines the color other than the selected color, and determining accuracy of correction by comparing the measure of accuracy to a predetermined accuracy criterion, and wherein the color correction device performs the color correction using the color correction parameters.

\* \* \* \* \*